(12) United States Patent
Ma et al.

(10) Patent No.: US 12,095,318 B2
(45) Date of Patent: Sep. 17, 2024

(54) VACUUM DESORPTION, IMPREGNATION AND CURING SYSTEM, VACUUM DESORPTION DEVICE, AND VACUUM DESORPTION PROCESS FOR PROTECTIVE LAYER OF MAGNETIC POLE

(71) Applicant: BEIJING GOLDWIND SCIENCE & CREATION WINDPOWER EQUIPMENT CO., LTD., Beijing (CN)

(72) Inventors: Shengjun Ma, Beijing (CN); Wanshun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 504 days.

(21) Appl. No.: 17/394,976

(22) Filed: Aug. 5, 2021

(65) Prior Publication Data
US 2021/0367492 A1    Nov. 25, 2021

Related U.S. Application Data

(62) Division of application No. 16/068,818, filed as application No. PCT/CN2017/099021 on Aug. 25, 2017, now abandoned.

(30) Foreign Application Priority Data

Oct. 31, 2016  (CN) .......................... 201610932194.8

(51) Int. Cl.
*H02K 15/12*  (2006.01)
*B29C 70/16*  (2006.01)
(Continued)

(52) U.S. Cl.
CPC ............. *H02K 15/12* (2013.01); *B29C 70/16* (2013.01); *B29C 70/443* (2013.01); *B29C 70/68* (2013.01);
(Continued)

(58) Field of Classification Search
USPC ......... 118/50, 50.1, 620, 641–643, 666, 667, 118/692, 712, 688; 425/89, 127, 129.1,
(Continued)

(56) References Cited

U.S. PATENT DOCUMENTS 4,577,078 A * 3/1986 Noda ........................ H05B 6/80
                                                                219/696
9,339,976 B2 * 5/2016 Schneiderbauer .... B29C 70/021
(Continued)

FOREIGN PATENT DOCUMENTS

CN            104325657 A  *  2/2015  ............. B29C 70/36

OTHER PUBLICATIONS

English Translation CN104325657 (Year: 2015).*
Thermoset-matrix composites for lightweight automotive structures (Year: 2010).*

*Primary Examiner* — Yewebdar T Tadesse
(74) *Attorney, Agent, or Firm* — Frank Gao, Esq.

(57) ABSTRACT

A vacuum desorption, impregnation and curing system, a vacuum desorption device and a vacuum desorption process for a protective layer of a magnetic pole are provided. Before injection of an impregnation liquid, vacuum desorption is performed on a sealed system formed by a magnetic yoke and a vacuum bag. A functional relationship about a vacuum degree or pressure in the sealed system is established so as to control the procedure of the vacuum desorption. Parameters in the functional relationship include an average suctioned gas volume flow of a vacuum pump, duration of vacuumization, an initial pressure in the sealed
(Continued)

system, as well as an initial volume of the sealed system. With the functional relationship for the vacuum impregnation and curing system and the vacuum impregnation and curing process, a vacuum desorption standard is provided, a desorption time may be grasped better, and mutual verification effect is formed in conjunction with the detected pressure.

19 Claims, 9 Drawing Sheets

(51) Int. Cl.
    *B29C 70/44* (2006.01)
    *B29C 70/68* (2006.01)
    *B29C 70/70* (2006.01)
    *H02K 1/00* (2006.01)
    *H02K 1/2788* (2022.01)
    *H02K 15/03* (2006.01)
    *B29K 705/12* (2006.01)
    *B29L 31/00* (2006.01)
    *B29L 31/08* (2006.01)

(52) U.S. Cl.
    CPC ............... *B29C 70/70* (2013.01); *H02K 1/00* (2013.01); *H02K 1/2788* (2022.01); *H02K 15/03* (2013.01); *B29K 2705/12* (2013.01); *B29K 2995/0008* (2013.01); *B29L 2031/085* (2013.01); *B29L 2031/749* (2013.01)

(58) Field of Classification Search
    USPC .................. 425/150, 388, 405.1, 405.2, 546
    See application file for complete search history.

(56) References Cited

U.S. PATENT DOCUMENTS

2002/0020934 A1* 2/2002 Hinz ................... B29C 70/443
                                                    264/102
2015/0099834 A1* 4/2015 Barnell ................ B29C 70/443
                                                    523/468

* cited by examiner

VACUUM DESORPTION, IMPREGNATION AND CURING SYSTEM, VACUUM DESORPTION DEVICE, AND VACUUM DESORPTION PROCESS FOR PROTECTIVE LAYER OF MAGNETIC POLE

CROSS-REFERENCE TO RELATED APPLICATIONS

The present application is a Division of U.S. application Ser. No. 16/068,818, filed on Jul. 9, 2018, which is a National Phase entry of PCT Application No. PCT/CN2017/099021, filed on Aug. 25, 2017, which claims the benefit of priority to Chinese patent application 201610932194.8 titled "VACUUM DESORPTION, IMPREGNATION AND CURING SYSTEM, VACUUM DESORPTION DEVICE, AND VACUUM DESORPTION PROCESS FOR PROTECTIVE LAYER OF MAGNETIC POLE", filed with the Chinese State Intellectual Property Office on Oct. 31, 2016. The entire contents of these applications are incorporated herein by reference in their entireties.

FIELD

This application relates to the technical field of electrodes, and in particular to a vacuum desorption, impregnation and curing system, a vacuum desorption device and a vacuum desorption process for a protective layer of a magnetic pole.

BACKGROUND

Reference is made to FIG. 1, which is a schematic view of a forming system for forming a protective layer for a magnetic pole of a permanent magnet motor. FIG. 2 is a schematic view showing details at a magnet steel in FIG. 1.

In FIG. 1, a magnet steel 16 is provided at an inner wall of a magnetic yoke 15 of an outer rotor. The magnet steel 16 is pressed tightly against the magnetic yoke 15 through a pressing strip and fastened by a bolt. In addition, a protective layer is further formed on a surface of the magnet steel 16 by glue injection. The specific procedure is as follows.

Firstly, the surface of the magnet steel 16 is covered by a reinforcing material 142 (for example, a fiberglass cloth), a demoulding cloth 143 and a flow guide net 141 in a listed sequence, and then a lightweight, flexible vacuum bag 17 is used for closing and covering. Thus, the vacuum bag 17, the magnet steel 16 and the pressing strip for the magnet steel 16, and the inner wall of and the magnetic yoke 15 form a sealed system. A sealing strip 19 is provided between the vacuum bag 17 and the inner wall of the magnetic yoke 15 for sealing.

Then, the sealed system is vacuumized by means of a vacuum pump 18 to compact the reinforcing material 142, for generating a drive pressure gradient for an impregnation liquid (e.g., resin, adhesive, etc.). After the vacuum bag 17 is closed, a glue injection port 171 and a discharge port 172 are formed. The resin is stored in a resin system tank 12. The resin enters the sealed system via the glue injection port 171 from an input pipeline 131 under the action of the vacuum pump 18. A small amount of the resin may enter an output pipeline 132 via the discharge port 172 and then enters a resin collector 11. A vacuum gauge 111 is provided at the position of the resin collector 11. The vacuum pump 18 is provided with a drive motor 182 and a regulating valve 181.

With a reinforcing resin flexible molding process improved by means of the reinforcing material 142, a gap between the magnet steel 16 and the pressing strip for fixing the magnet steel 16 is filled, a gap between the magnet steel 16 and the inner wall of the magnetic yoke 15 is infused, and the magnet steel 16 and the pressing strip thereof are covered. After the reinforcing material 142 is cured, the demoulding cloth 143 is removed, thus, a protective layer for filling and fixing the entire magnetic pole is formed.

In the case of the impregnation liquid being injected in the above manner, the rotor is vertically arranged. After the impregnation and curing, there are still some "vacuoles", i.e. "bubbles", in a lower one-third region of the inner wall of the magnetic yoke 15 as viewed from a front side of the inner wall of the magnetic yoke 14. Although the results may be different in the case that the reinforcing materials having different densities are used, the bubbles still exist.

The bubbles are formed after curing, which may inevitably affect the performance and the service life of the protective layer. Therefore, it is urgent to improve the current glue injection process, so as to reduce the bubbles in the cured protective layer.

SUMMARY

In order to address the above technical issue, a vacuum desorption, impregnation and curing system, a vacuum desorption device and a vacuum desorption process which are applied to a protective layer of a magnetic pole are provided according to the present application, which may reduce bubbles in the protective layer and improve the performance of a magnetic pole component.

A vacuum desorption process applied to a protective layer for a magnetic pole is provided according to the present application, including:
  performing, before injection of an impregnation liquid, vacuum desorption on a sealed system formed by a magnetic yoke and a vacuum bag; and
  establishing a functional relationship about a vacuum degree or pressure in the sealed system so as to control a procedure of the vacuum desorption,
  specifically, parameters in the functional relationship include an average suctioned gas volume flow of a vacuum pump, duration of vacuumization, an initial pressure in the sealed system, as well as an initial volume of the sealed system.
  Preferably, the parameters for establishing the functional relationship further include an initial temperature of gas in the sealed system as well as a current temperature during the vacuumization.
  Preferably, the parameters in the functional relationship further include a polytropic index of a thermodynamic polytropic procedure; or,
  the parameters in the functional relationship further include a polytropic index of a thermodynamic polytropic procedure as well as an initial density and a current density of gas in the sealed system.
  Preferably, the parameters in the functional relationship further include an altitude at which the sealed system is located, the initial pressure in the sealed system is determined by the altitude and a standard atmospheric pressure at sea level, and an initial temperature in the sealed system is determined by the altitude and a standard air temperature at sea level.
  Preferably, the parameters in the functional relationship further include an altitude at which the sealed system is located, and the initial pressure in the sealed system is determined by the altitude and a standard atmospheric pressure at sea level, and the initial density is determined by an initial relative humidity, an initial temperature, the initial pressure, and a partial pressure of water vapor in saturated wet air.

Preferably, the vacuum degree required for the desorption is determined by conducting a test, and the duration required for the vacuumization is determined according to the functional relationship as well as an initial temperature, an initial pressure and an initial relative humidity during actual vacuum desorption.

Preferably, the average suctioned gas volume flow of the vacuum pump is adjusted to adjust suction duration.

Preferably, the pressure in the sealed system is monitored in real time, and mutual verification is performed between a procedure of controlling the vacuum desorption according to the functional relationship and a procedure of monitoring the pressure in the sealed system in real time.

Preferably, subsequent to or at the same time as the vacuum desorption, heated and dried air is passed into the sealed system.

Preferably, before the impregnation liquid is injected, the sealed system is further subjected to a heating desorption treatment and/or an ultrasonic desorption treatment.

A vacuum desorption, impregnation and curing process applied to a protective layer for a magnetic pole is further provided according to the present application, including steps of:

assembling a pressing strip and a magnet steel to corresponding positions of a wall surface of a magnetic yoke and mounting a vacuum bag to the wall surface of the magnetic yoke, specifically, the vacuum bag and the wall surface of the magnetic yoke form a sealed system;

performing the vacuum desorption process according to any one of the above aspects in the sealed system; and after the vacuum desorption, injecting an impregnation liquid into the sealed system in an vacuumized state.

Preferably, when the impregnation liquid is injected in the vacuumized state, the vacuum pump is adjusted for allowing an average suctioned gas volume flow to increase for a predetermined time and then decrease for the predetermined time. The procedure of increasing and then decreasing of the average suctioned gas volume flow is repeated multiple times.

Preferably, after the impregnation liquid is injected, a curing step is performed, a temperature increase control, a constant temperature control and a temperature decrease control are performed in sequence during the curing step, and during decrease of the temperature, the average suctioned gas volume flow of the vacuum pump is adjusted, which allows the average suctioned gas volume flow to gradually decrease.

A vacuum desorption device for a protective layer of a magnetic pole is provided further provided according to the present application. A magnetic yoke and a vacuum bag form a sealed system. The vacuum desorption device includes a controller and a vacuum pump. The vacuum pump is configured to perform vacuum desorption on the sealed system. The controller is pre-stored with a functional relationship about a vacuum degree or pressure in the sealed system to control a procedure of the vacuum desorption. Parameters in the functional relationship include an average suctioned gas volume flow of the vacuum pump, duration of vacuumization, an initial pressure in the sealed system and an initial volume of the sealed system.

Preferably, the vacuum desorption device further includes a temperature sensor which is configured to detect an initial temperature in the sealed system and a current temperature in the sealed system during the vacuumization and to output the initial temperature and the current temperature to the controller. An expansion procedure of gas suctioned out by vacuumization is a variable temperature procedure. The parameters in the functional relationship further include the initial temperature and the current temperature of the sealed system.

Preferably, the vacuum desorption device further includes a pressure sensor or a densimeter, the pressure sensor is configured to detect a current pressure in the procedure that the sealed system is vacuumized, and the densimeter configured to detect an initial density and a current density. An expansion procedure of gas suctioned out by vacuumization is a variable temperature procedure. The parameters in the functional relationship further include a polytropic index of a thermodynamic polytropic procedure.

Preferably, the parameters in the functional relationship pre-stored in the controller further include an altitude. The initial pressure in the sealed system is determined by the attitude and a standard atmospheric pressure at sea level. The initial density is determined by an initial relative humidity, an initial temperature, the initial pressure and a partial pressure of water vapor in saturated wet air.

Preferably, the vacuum pump is provided with a variable frequency governor to adjust the average suctioned gas volume flow of the vacuum pump.

Preferably, the vacuum desorption device further includes an air heater and an air inlet filter which are in communication with the sealed system. Air enters the sealed system under an action of the vacuum pump after passing through the air heater and the air inlet filter.

Preferably, an outlet air filter and/or a desorption process measurement device is provided between the sealed system and the vacuum pump. The desorption process measurement device is configured to detect a content of water vapor in the air.

Preferably, the vacuum desorption device further includes a heating device and/or an ultrasonic device. The heating device and/or the ultrasonic device is configured to perform a heating desorption treatment on the sealed system.

Preferably, the heating device is at least one of a microwave heating device, a far-infrared heat source and an electric heating film, the electric heating film is laid at a wall surface of the magnetic yoke, and a heat insulation layer is laid in addition to the electric heating film at the wall surface of the magnetic yoke.

Preferably, two ends of the magnetic yoke are provided with sealing and shielding thermal insulation covers to enclose a microwave from the microwave heating device.

Preferably, the microwave heating device includes a radiant heater for inputting a microwave, and an inside surface of the radiant heater facing the sealed system is provided with a water storage sponge.

Preferably, the radiant heater has a horn-shaped housing, and the water storage sponge is provided at an inside surface of the horn-shaped housing.

A vacuum desorption, impregnation and curing system applied to a protective layer for a magnetic pole is further provided according to the present application, including:
  a pressing strip;
  a magnet steel;
  a magnetic yoke;
  a vacuum bag mounted to a wall surface of the magnetic yoke, specifically, the vacuum bag and the wall surface of the magnetic yoke form a sealed system; and
  the vacuum desorption device according to any one of the above aspects.

Preferably, the vacuum desorption, impregnation and curing system further includes a system tank configured to load an impregnation liquid. A stirrer configured to stir the impregnation liquid is provided inside the system tank.

Preferably, the system tank includes a stirring tank and an output tank in communication with each other, the stirring tank is located upstream of the output tank, the stirrer is provided inside the stirring tank, and the output tank is further provided with an ultrasonic defoaming and vibrating bar.

Preferably, the stirring tank is provided with a first air outlet, the output tank is provided with a second air outlet, the first air outlet is communicated with a vacuum pump, and the second air outlet is communicated with the vacuum pump or atmosphere.

Preferably, a heating resistor is provided inside the stirrer to heat the impregnation liquid while stirring.

Preferably, the stirrer is driven by an electric motor, the electric motor is provided with a hollow shaft, and a bottom end of the hollow shaft is provided with a stirring blade of the stirrer. Extension wires of a winding of the electric motor extend along the hollow shaft to the stirring blade and form an electrical circuit, the heating resistor is located at the stirring blade, and the extension wires are configured to supply electric power for the heating resistor.

Preferably, the stirrer is driven by an electric motor, the electric motor is provided with a hollow shaft, and a bottom end of the hollow shaft is provided with a stirring blade of the stirrer. An ultrasonic high-frequency vibration emission head is further provided at a bottom of the hollow shaft.

Preferably, the vacuum desorption, impregnation and curing system further includes a microwave preheating device. The microwave preheating device is provided between a system tank and the sealed system, for microwave heating of an impregnation liquid before the impregnation liquid is input to the sealed system. The system tank is configured to load the impregnation liquid.

Preferably, the microwave preheating device is provided with a resin chamber, a microwave from the microwave preheating device is input into the resin chamber. The impregnation liquid in the system tank enters the resin chamber to be heated.

Preferably, a non-metallic screen plate is provided inside the resin chamber, the screen plate is provided with multiple screen openings, and the impregnation liquid is heated by the microwave after passing through the screen openings.

Preferably, the vacuum desorption, impregnation and curing system further includes an ultrasonic wave emitting device configured to apply ultrasonic vibration to the protective layer during curing.

Preferably, the ultrasonic wave transmitting device is provided with several ultrasonic wave emission heads facing an outer side of the vacuum bag. An ultrasonic wave emission cavity is formed between a housing of the ultrasonic device and the vacuum bag.

Preferably, a resin collector is provided between the sealed system and the vacuum pump.

Preferably, the collector is provided with a vacuum gauge.

Preferably, the vacuum desorption, impregnation and curing system further includes a filling progress measurement device and/or a thickness measurement device. The filling progress measurement device is configured to detect a filling progress of filling with an impregnation liquid. The thickness measurement device configured to detect a thickness of the protective layer.

The vacuum desorption, impregnation and curing system, the vacuum desorption device and the vacuum desorption process applied to a protective layer for the magnetic pole are provided according to the present application. Before injection of the impregnation liquid, vacuum desorption is performed on the sealed system formed by the magnetic yoke and the vacuum bag. The functional relationship about the vacuum degree or the pressure in the sealed system is established so as to control the procedure of the vacuum desorption. After suction by the vacuum pump at the average suctioned gas volume flow, the current pressure (the absolute pressure) or the vacuum degree of the gas in the sealed system may be calculated according to the functional relationship. Alternatively, in the case that a target vacuum degree (which may be determined by conducting a test) required for the vacuum desorption is known, the suction duration required for the required vacuum degree may be calculated, since the average suctioned gas volume flow and the initial volume are known values.

In this way, a technician can grasp the time of the vacuum desorption well when performing the vacuum desorption. Although the vacuum degree or the absolute pressure in the sealed system may be obtained by pressure detection, errors may occur for a pressure sensor and the pressure sensor may have malfunctions. The functional relationship provided in this solution may provide a vacuum desorption standard, in an aspect, a rough suction duration may be calculated, so as to facilitate arrangement of the subsequent process flow. In addition, a pressure sensor is provided at an inner side of the vacuum bag, and a mutual verification effect may be obtained through the pressure sensor and control of the vacuum desorption described above. In the case that a fault exists in the pressure sensor, vacuum desorption may still be ensured. If the pressure sensor operates normally with an abnormal feedback of the pressure, it indicates that the vacuum pump fails or the vacuum bag leaks.

Figure 1:
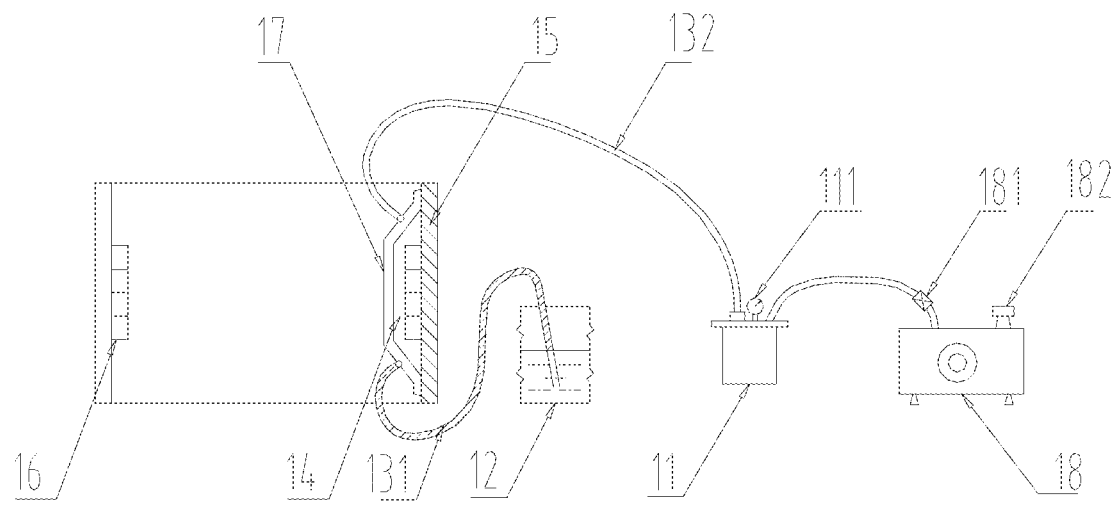
FIG. 1 is a schematic view of a forming system for forming a protective layer for a magnetic pole of a permanent magnet motor.
Figure 2:
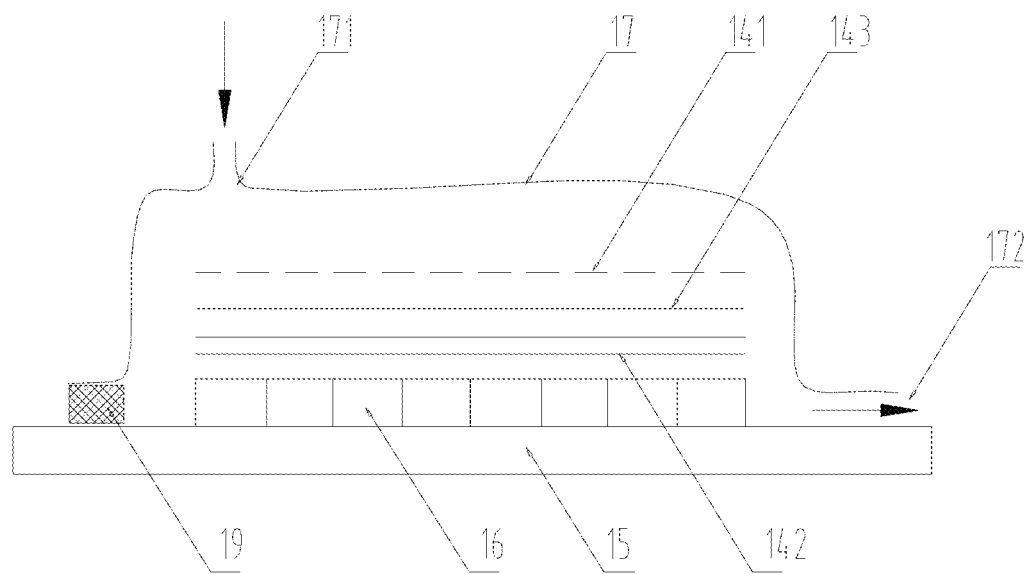
FIG. 2 is a schematic view showing details at a magnet steel in FIG. 1.

EXPLANATION OF REFERENCE NUMERALS
REFERRED TO IN FIG. 1 AND FIG. 2

| | |
|---|---|
| 11 | resin collector, |
| 12 | resin system tank, |
| 142 | reinforcing material, |
| 141 | flow guide net, |
| 143 | demoulding cloth, |
| 15 | magnetic yoke, |
| 16 | magnet steel, |
| 17 | vacuum bag, |
| 171 | glue injection port, |
| 172 | discharge port, |
| 18 | vacuum pump, |
| 181 | regulating valve, |
| 182 | drive motor, |
| 19 | sealing strip. |

EXPLANATION OF REFERENCE NUMERALS
REFERRED TO IN FIGS. 3 TO 12

| | |
|---|---|
| 21 | magnetic yoke, |
| 22 | magnet steel, |
| 231 | input pipeline, |
| 232 | output pipeline, |
| 233 | flowmeter, |
| 241 | flow guide net, |
| 242 | reinforcing material, |
| 242' | protective layer, |
| 243 | demoulding cloth, |
| 25 | vacuum bag, |
| 251 | injection port, |
| 252 | discharge port, |
| 26 | pressing strip, |
| 27 | stator iron core, |
| 28 | bolt, |
| a | bevel contact surface, |
| b | vertical contact surface; |
| 31 | electric heating film, |
| 32 | heat insulation layer, |
| 33 | sealing and shielding thermal insulation cover, |
| 34 | far-infrared heat source, |
| 35 | radiant heater, |
| 36 | ultrasonic wave emitting device, |
| 361 | ultrasonic wave emission head, |
| 362 | emission cavity; |
| 41 | temperature sensor, |
| 42 | pressure sensor, |
| 43 | temperature sensor; |
| 51 | air heater, |
| 52 | air inlet filter; |
| 60 | outlet air filter, device; |
| 61 | desorption process measurement |
| 70 | vacuum pump, |
| 71 | vacuum pump regulating valve, |
| 72 | drive motor; |
| 81 | thickness measurement device, |
| 82 | filling progress measurement device, |
| 90 | resin collector, |
| 91 | vacuum gauge; |
| 101 | resin stirring tank, |

-continued

| | |
|---|---|
| 102 | resin output tank, |
| 103a | first regulating valve, |
| 103b | second regulating valve, |
| 104 | ultrasonic defoaming and vibrating bar, |
| 105 | second air outlet, |
| 106 | electric motor, |
| 106a | ultrasonic high-frequency vibration emission head, |
| 106b | stirring blade, |
| 106c | hollow shaft, |
| 106d | heating resistor, |
| 107 | first air outlet, |
| 200 | microwave preheating device, |
| 201 | control unit, |
| 202 | microwave source, |
| 203 | circulator, |
| 204 | stub tuner, |
| 205 | resin chamber, |
| 206 | cooling system, |
| 207 | water load. |

DETAILED DESCRIPTION OF EMBODIMENTS

In order to make the person skilled in the art have a better understanding of the technical solutions of the present application, the present application is described hereinafter in further detail in conjunction with the drawings and embodiments.

Figure 3:
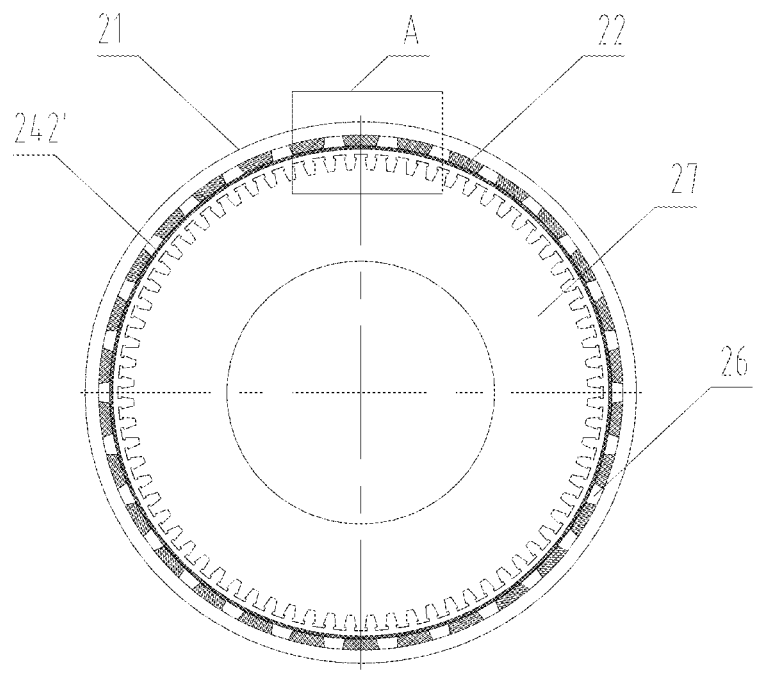
FIG. 3 is a schematic view showing the structure of a magnetic pole component of the permanent magnet motor and a protective layer for the magnetic pole component.
Figure 4:
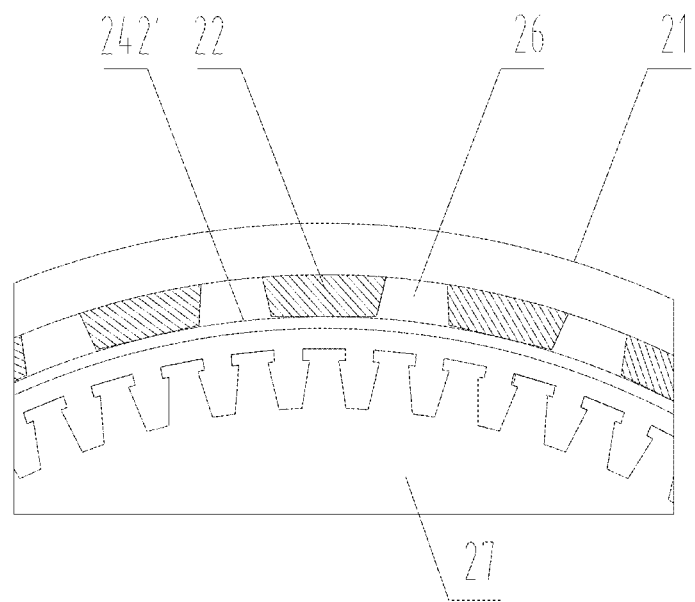
FIG. 4 is a partially enlarged schematic view of part A in FIG. 3.
Figure 5:
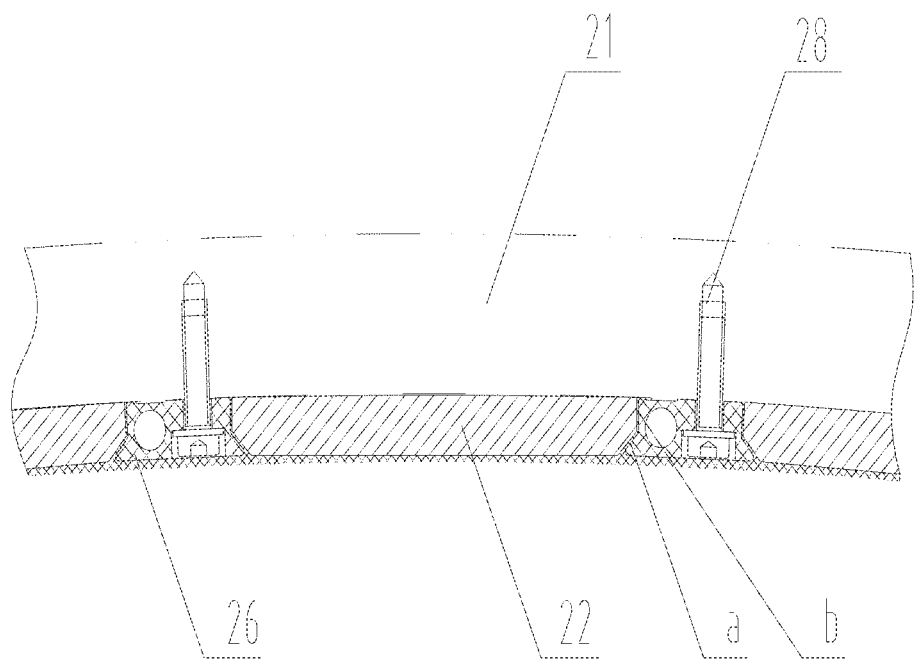
FIG. 5 is a schematic view of a pressing strip in FIG. 3 pressing the magnet steel tightly against a wall surface of a magnetic yoke.

Reference is made to FIGS. 3 to 5. FIG. 3 is a schematic view showing the structure of a magnetic pole component of a permanent magnet motor and a protective layer for the magnetic pole component. FIG. 4 is a partially enlarged schematic view of part A in FIG. 3. FIG. 5 is a schematic view showing that a magnet steel is pressed tightly against a wall surface of a magnetic yoke by a pressing strip.

The magnetic pole component shown in FIG. 3 includes an outer rotor structure and a stator iron core 27 matching with each other. A magnet steel 22 is pressed tightly against an inner wall of a magnetic yoke 21 of an outer rotor by a pressing strip 26. The magnet steel 22 and the inner wall of the magnetic yoke 21 as well as the pressing strip 26 are covered by a protective layer 242'. The pressing strip 26 is fixed to the magnetic yoke 21 specifically by a bolt 28. FIG. 5 is a radial view of the magnetic yoke 21 of the outer rotor of the permanently magnetized magnetic pole component. A bolt head of the bolt 28 is located inside the pressing strip 26. The inner wall of the magnetic yoke 21 is provided with threads. The pressing strip 26 is fastened by the bolt 28 by means of the threads. The pressing strip 26 is fixed to the inner wall of the magnetic yoke 21 for indirectly fixing the magnet steel 22.

In FIG. 5, each magnet steel 22 have two contact surfaces, a vertical contact surface "b" and a bevel contact surface "a" as shown in the figure, in contact with the adjacent pressing strip 26. The pressed magnet steel 22 is higher than a corner portion of the trapezoidal bevel. As analyzed and viewed from the perspective of elastic mechanics, a "qualitative" change occurs from the "corner" portions of two ends to an upper surface of the magnet steel 22, and the compressive strength that the magnet steel 22 can withstand also changes. In the procedure that the magnet steel 22 is moved after being pressed by the pressing strip 26 to be "fixed" and the magnetic pole of the motor is in operation, a risk that the ends of the magnet steel 22 are broken due to the stress is reduced. However, there are still hidden dangers that the bolt 28 may become loose, be broken and fall off after continuously working for a long time. Under a magnetic pulling force pulsing in a radial direction applied by a stator armature of a generator and under the action of torque in a circumferential direction of the inner wall of the magnetic yoke 21, the movement of the magnet steel 22 between the two adjacent pressing strips 26 inevitably becomes play from pure vibration, thus, the contact surfaces of the magnet steel 22 are subjected to a local stress to generate cracks, which causes local fragmentation. In the face of the hidden dangers indeed existing in the above structure, it is required to improve the process for improving the integration effect of filling, bonding and curing of an impregnation liquid.

Figure 7:
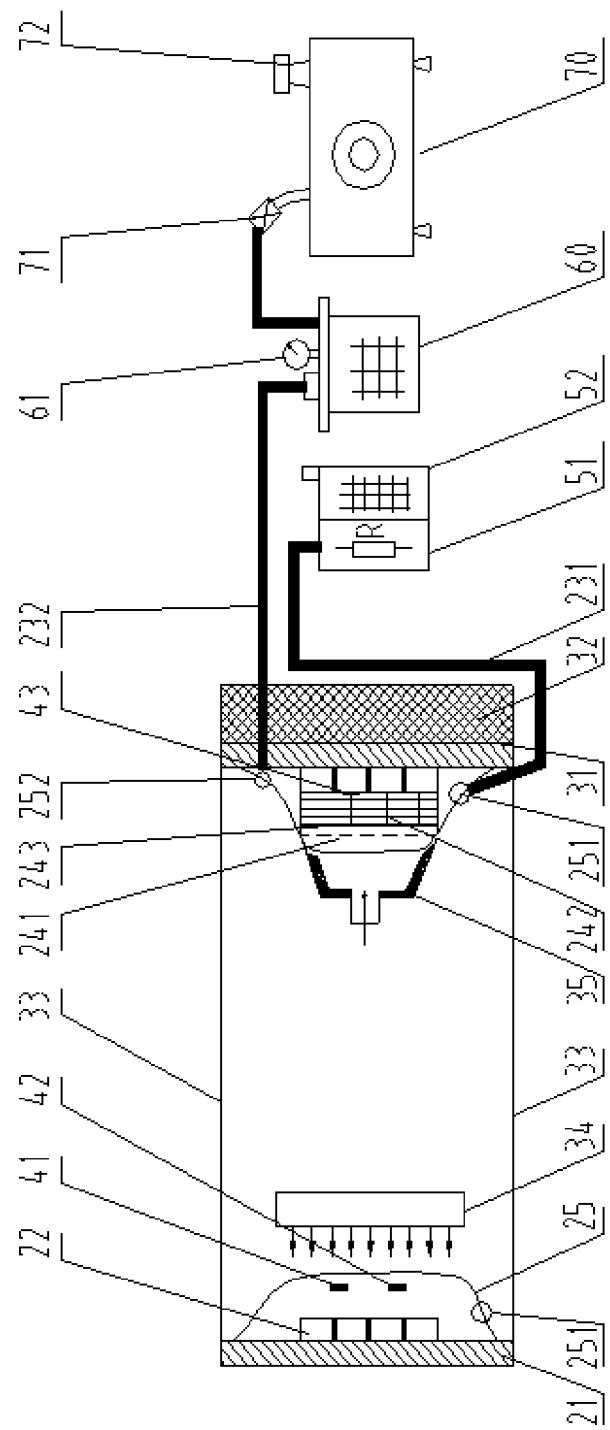
FIG. 7 is a schematic view showing the structure of an embodiment of a vacuum desorption process system according to the present application.

As described in the background, a resin flexible molding process requires the reinforcing material 242 (In FIG. 7, the impregnation liquid is injected into the reinforcing material 242 to form the protective layer 242' shown in FIG. 4). There is often a gap between the reinforcing material 242 such as a fiberglass cloth and the magnet steel 22 and a gap between the reinforcing material 242 and a wall surface of the magnetic yoke 21, and the reinforcing material 242 itself is a braid made from a porous material, and there are also gaps in the reinforcing material 242. Air and water vapor may be adsorbed in these gaps. Water may cure a sizing material having an isocyanate group with release of carbon dioxide, which may cause the formation of foamed polymer. The carried water in actual may gasify at a temperature of 43 degrees Celsius in a vacuum environment, thus, bubbles are generated.

In addition, after an upper two-thirds region of the magnetic pole component is filled up with the impregnation liquid, a vacuum pressure difference between the pressure inside the magnetic pole component and the pressure outside the magnetic pole component is close to a vacuum degree. However, at a lower one-third region of the magnetic pole component, closer to an injection port 251 of the impregnation liquid (referring to FIG. 7), a pressure difference between the pressure inside the lower one-third region and the pressure outside the lower one-third region is lower than the pressure difference between the pressure inside the upper two-thirds region and the pressure outside the upper two-thirds region at a later stage during injection, and the pressure of an outer surface, corresponding to the lower one-third region, against the reinforcing material 242 is lower than the pressure of an outer surface, corresponding to the upper two-thirds region, against the reinforcing material 242. During vacuum glue injection, air and water vapor carried in the material of the lower one-third region is more difficult to be discharged than air and water vapor carried in the material of the upper two-thirds region, and many bubbles are formed in the lower one-third region.

For reducing the bubbles in the protective layer 242' formed after the impregnation liquid is injected, based on the analyzed above reasons, this solution focuses on reducing the bubbles before the impregnation liquid is injected. Through research, a desorption test is firstly performed.

Figure 6:
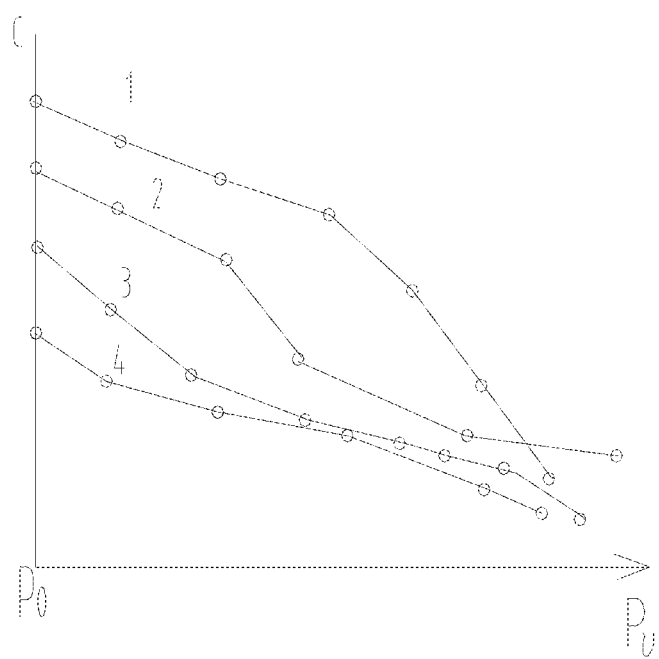
FIG. 6 is a relational diagram showing that an adsorption amount of air adsorbed on a solid surface of the magnetic pole component changes as a vacuum degree in a sealed system increases.

Reference is made to FIGS. 6 to 7. FIG. 6 is a relational diagram showing that the adsorption amount of air adsorbed on a solid surface of the magnetic pole component changes as a vacuum degree in a sealed system increases. FIG. 7 is a schematic view showing the structure of an embodiment of a vacuum desorption process system according to the present application.

The sealed system is a sealed space formed by a provided vacuum bag 25, the magnet steel 22 and the magnetic yoke 21 in the forming process for forming the protective layer. The solids in the magnetic pole component mainly include the reinforcing material 242 (such as a fiberglass cloth), the magnet steel 22, the wall surface of the magnetic yoke 21 and the pressing strip 26 for fixing the magnet steel 22.

Curves representing the air amount adsorbed respectively by the reinforcing material 242, the magnet steel 22, the wall surface of the magnetic yoke 21 and the pressing strip 26 as a function of the vacuum degree are indicated by curves 1, 2, 3, 4 in FIG. 6 in the same order as the order described above. Pv indicates a vacuum degree, C indicates an adsorption amount of air, and P0 indicates a standard atmospheric pressure.

As may be seen from FIG. 6, as the vacuum degree increases, the adsorption amount of air adsorbed on the solid surface of the magnetic pole component decreases. Therefore, a vacuum environment may be established for a desorption treatment, that is, using the relationship between the vacuum degree and the adsorption amount of air, the vacuum degree is increased to decrease the adsorption amount of air adsorbed on the solid surface of the magnetic pole component, thereby reducing the bubbles which are likely to be formed in future when the impregnation liquid is injected from the source.

As may also be seen from FIG. 6, among the reinforcing material 242, the magnet steel 22, the wall surface of the magnetic yoke 21 and the pressing strip 26, the reinforcing material 242 has a maximum adsorption capacity due to the porous structure of the reinforcing material 242. In the procedure that the desorption process is carried out, the desorption from the reinforcing material 242 should be considered as a qualified standard, that is, the vacuum degree should meet the desorption requirement of desorption from the reinforcing material 242, correspondingly, the desorption requirements of desorption from the magnet steel 22, the wall surface of the magnetic yoke 21 and the pressing strip 26 are met.

It may be understood from the above description that through the desorption test, a vacuum desorption method is determined, that is, vacuum desorption is performed before vacuum injection of the impregnation liquid.

Through the above research, it is found that the vacuum desorption may be realized by vacuumization. In the present application, the vacuum desorption is further specified and a functional relationship is established, so as to make the procedure of the vacuum desorption be controlled during actual operation.

In this embodiment, the magnet steel 22 is provided at the inner wall of the magnetic yoke 21, and then the reinforcing material 242, the demoulding cloth 243, the flow guide net 241 and the vacuum bag 25 are laid in a listed sequence. A sealed system is formed between the vacuum bag 25 and the magnetic yoke 21, and an injection port 251 and a discharge port 252 are formed. The injection port 251 may be available for injecting the impregnation liquid, and the discharge port 252 may be similarly available for discharging the impregnation liquid. In this solution, the injection port 251 and the discharge port 252 may further serve as an inlet and an outlet for the vacuum desorption, respectively.

In this case, the vacuum bag 25 and the magnetic yoke 21 form the sealed system that is separated from the outside. The volume of the sealed system is actually formed by the gaps, among the vacuum bag 25, the flow guide net 241, the demoulding cloth 243, the reinforcing material 242, the magnetic yoke 21, the magnet steel 22 and the pressing strip 26, and the pipelines (including a pipeline connected to a vacuum pump 70 and a pipeline connected to an air filter shown in the figure, that is, an input pipeline and an output pipeline) communicated with the outside, and the pipelines are communicated with the outside. The sealed system in this case is equivalent to a vacuum container, thus, the vacuum container formed by the vacuum pump 70 and this sealed system constitute a vacuum desorption system.

Firstly, it is determined that this vacuum desorption system is mounted at a place above sea level where an atmospheric pressure is indicated by $P_0$ (Pa), an atmospheric temperature is indicated by $T_0(K)$, and the volume of the sealed system is indicated by $V_0(m^3)$. As gas is suctioned by the vacuum pump 70 from the sealed system, the amount of gas in the sealed system may constantly decrease, thus the pressure in the sealed system may constantly decrease.

Assuming that an absolute pressure of the gas in the sealed system at an instant is indicated by P, the amount of the gas extracted is indicated by dV, correspondingly, the pressure in the sealed system decreases by dp. In this procedure, if the temperature in the sealed system is remained constant, it may be derived from the Boyle-Mariotte law in the thermodynamics that:

$$p_0 V_0 = (p-dp)(V_0-dV)$$

It may be derived by arranging the above equation and omitting a derivative term dp that:

$$-dV = \frac{dp}{p} V_0$$

If the amount of the gas extracted from the sealed system described above increases from 0 to V, the absolute pressure in the sealed system decreases from an initial pressure $p_1$ (the initial pressure $p_1$ differs from the atmospheric pressure $P_0$ at sea level, since the sealed system is not necessarily located at sea level) to a final pressure $p_2$. In a pressure change range from $p_1$ to $p_2$, definite integration of the pressure as a variable is performed, that is $$-\int_0^V dV = V_0 \int_{p_1}^{p_2} \frac{dp}{p}$$

Therefore, it may be derived that:

$$V = V_0 \operatorname{Ln} \frac{p_1}{p_2} \qquad (1)$$

This equation (1) refers to the amount of the gas extracted from the sealed system.

In the equation (1), V indicates the amount of the gas suctioned and extracted by the vacuum pump 70 from the sealed system in $\tau$ (a suction duration of the vacuum pump 70).

In this way, an average suctioned gas volume flow $Q_V$ of the vacuum pump 70 to the sealed system (the volume of the gas extracted per unit time) may be expressed as:

$$Q_V = \frac{V}{\tau} = \frac{V_0}{\tau} \ln \frac{p_1}{p_2} \qquad (2)$$

It may be known that, in the case that an initial volume $V_0$ of the sealed system and the suction duration $\tau$ are constant, the average suctioned gas volume flow $Q_V$ of the vacuum pump 70 to the sealed system may change with a ratio $$\frac{p_1}{p_2}.$$

Similarly, it may be inferred that, during suctioning, the absolute pressure P of the gas in the sealed system at an instant should be a function of the average suctioned gas volume flow $Q_V$, the suction duration $\tau$ and the initial volume $V_0$ of the gas in the sealed system, that is, $$p = f(Q_V, V_0, \tau)$$

In the case that the size and the structure of the vacuum pump 70 are constant and a rotation speed of a rotor of a drive motor 72 is remained almost constant, the average suctioned gas volume flow $Q_V$ is actually a constant value, thus, the average suctioned gas volume flow of the conventional vacuum pump 70 is a constant value.

When the vacuum bag 25 is pressed tightly against the reinforcing material 242 (such as a fiberglass cloth), an initial volume of the gas in the sealed system in this case is expressed by $V_0$. Slight change of the initial volume may be ignored, and thus the initial volume may be regarded as an invariable, and the absolute pressure p of the gas in the sealed system at an instant changes only with the suction duration $\tau$. At any instant in the procedure that the gas in the sealed system is suctioned, an absolute pressure of the gas in the sealed system is indicated with p, an absolute temperature is indicated with T, and the mass of the gas is indicated with m, thus, it may be derived from the equation of state of an ideal gas that:

$$pV_0 = mRT \qquad (3)$$

In the equation (3), R indicates a gas constant.

In the case that the temperature T is remained constant, an infinitesimal gas having a mass of $d_m$ is extracted out, thus, it may be derived that:

$$dm = \frac{V_0}{RT} dp$$

That is, the absolute pressure of the gas in the sealed system decreases by dp with respect to an original absolute pressure.

In the case that the loss of flow resistance to airflow and the leakage which are caused by connecting links of the above system are not taken into account, the mass $d_m$ of the infinitesimal gas flowing out of the sealed system is precisely equal to the mass $dm_V$ of an infinitesimal gas that is suctioned into the above vacuum pump 70 during a period of time $d\tau$.

In the following expression, a negative sign is used to mean that the gas is suctioned into the vacuum pump 70, that is, $$-dm_V = -Q_V \rho d\tau = -Q_V \frac{p}{RT} d\tau$$

In the equation, $\rho$ indicates the density of the gas extracted from the sealed system described above.

In this thermodynamic procedure, the amount of the gas extracted from the sealed system should be equal to the amount of the gas suctioned into the vacuum pump 70.

That is:

$$-dm_V = dm,$$

$$\text{or, } -Q_V \frac{p}{RT} d\tau = \frac{V_0}{RT} dp$$

That is:

$$V_0 dp = -Q_V p\, d\tau \quad (4)$$

$$\text{or, } \frac{dp}{p} = -\frac{Q_V}{V_0} d\tau$$

It is assumed that $$\frac{Q_V}{V_0} = K = \frac{1}{\tau^*}.$$

The dimension of K is expressed as the reciprocal of the dimension of time, that is, 1/second or 1/s, and "s" indicates "second". The dimension of 1/K is expressed as the time, and τ' indicates a time constant of a change and transition procedure of the pressure in the sealed system described above.

The pressure of the gas in the sealed system is integrated by taking the initial pressure $p_1$ and a current pressure p at an instant in the procedure (after a period of time τ) as an upper limit of integration and a lower limit of integration, thus it may be derived that:

$$\int_{p_1}^{p} \frac{dp}{p} = -K \int_0^{\tau} d\tau = -\frac{1}{\tau^*} \int_0^{\tau} d\tau.$$

Thus, it is derived that:

$$p = p_1 e^{-K\tau} = p_1 e^{-\tau/\tau'} \quad (5)$$

According to a formula for calculating the vacuum degree, it may be derived that $p_v = p_0 - p$.

After suction by the vacuum pump 70 at the average suctioned gas volume flow $Q_V$ for τ, the current pressure (the absolute pressure) p or the vacuum degree $p_v$ of the gas in the sealed system may be calculated according to the equation (5). Alternatively, in the case that a target vacuum degree $p_v$ (which may be determined by conducting a test) required for the vacuum desorption is known, the suction duration τ required for the required vacuum degree $p_v$ may be calculated, since $Q_V$ and $V_0$ are known values.

In this way, a technician can grasp the time of the vacuum desorption well when performing the vacuum desorption. Although the vacuum degree or the absolute pressure in the sealed system may be obtained by pressure detection, errors may occur for a pressure sensor and the pressure sensor may have malfunctions. The functional relationship (5) provided in this solution may provide a vacuum desorption standard, in an aspect, a rough suction duration may be calculated, so as to facilitate arrangement of the subsequent process flow. In addition, a pressure sensor is provided at an inner side of the vacuum bag 25, and a mutual verification effect may be obtained through the pressure sensor and control of the vacuum desorption described above. In the case that a fault exists in the pressure sensor, vacuum desorption may still be ensured. If the pressure sensor operates normally with an abnormal feedback of the pressure, it indicates that the vacuum pump 70 fails or the vacuum bag 25 leaks.

In addition, in the present application, it is preferable that the vacuum pump 70 is equipped with a governor. If the vacuum pump 70 is driven by the drive motor 72, the drive motor 72 is equipped with a frequency convertible governor. A rotation speed of the drive motor 72 is changed by adjusting a drive voltage and a frequency of the drive motor 72, thereby adjusting the average suctioned gas volume flow $Q_V$ of the vacuum pump 70, which is significantly different from the current constant-speed vacuum pump 70. In this solution, the frequency convertible governor is equipped to adjust the average suctioned gas volume flow of the vacuum pump 70. In the case that the suction duration calculated based on the target vacuum degree is difficult to meet the work requirement, or in the case that even if the suction duration is extended, it is difficult to achieve the required target vacuum degree, the frequency convertible governor of the vacuum pump 70 may be adjusted to adjust the magnitude of the average suctioned gas volume flow, thereby achieving required effect of vacuum desorption within a predetermined time.

When the gas is suctioned from the sealed system, if an expansion procedure of the remaining gas in the sealed system after a portion of the gas in the sealed system is extracted out is not a constant temperature procedure with a decrease or an increase in temperature (corresponding to energy output to the outside or energy input to the sealed system, respectively), it may be known according to the equation (3) that, the mass of the gas in the sealed system described above is not only related to the pressure but also to the change of the temperature of the gas in the sealed system described above, that is, m=F(p,T). An infinitesimal change of the mass of the gas in the sealed system may be expressed as:

$$dm = \left(\frac{\partial m}{\partial p}\right)_T dp + \left(\frac{\partial m}{\partial T}\right)_p dT$$

$$dm = \frac{V_0}{RT} dp - \frac{V_0 p}{RT^2} dT$$

Without considering the resistance loss and other energy losses generated by flow of the gas in the sealed system, the infinitesimal change of the mass of the gas in the sealed system indicates the mass of the gas flowing out of the sealed system with $d_m$, that is, the mass $dm_V$ of the gas suctioned by the vacuum pump 70 within a time dτ, that is, $dm = -dm_V$, thus, it is derived that:

$$\frac{V_0}{RT} dp - \frac{V_0 p}{RT^2} dT = -Q_V \frac{p}{RT} d\tau \quad (6)$$

$$\int_{p_1}^{p} \frac{dp}{p} - \int_{T_1}^{T} \frac{dT}{T} p = -\frac{Q_V}{V_0} \int_0^{\tau} d\tau$$

$$p = p_1 \frac{T}{T_1} e^{-K\tau} = p_1 \frac{T}{T_1} e^{-\tau/\tau^*}$$

In the equation (6), $T_1$ indicates an initial temperature of the gas in the sealed system, and T indicates a current temperature after the suction duration τ.

After the gas in the sealed system described above is extracted out, the expansion procedure of the remaining gas in the sealed system is a thermodynamic polytropic procedure. A polytropic index of the polytropic procedure is indicated by n. The expansion procedure follows the law of the thermodynamic polytropic procedure. Correspondingly, the relationship between the change in temperature and the change in pressure of the remaining gas is expressed as:

$$\frac{T}{T_1} = \left(\frac{p}{p_1}\right)^{\frac{n-1}{n}} \frac{T}{T_1} = \left(\frac{\rho}{\rho_1}\right)^{n-1}$$

In the above equations, $\rho_1$ indicates an initial density of the gas in the sealed system, $\rho$ indicates a current density of the gas after a time $\tau$, $T_1$ indicates an initial temperature of the gas in the sealed system, and $T$ indicates a current temperature after the suction duration $\tau$.

Thus:

$$p = p_1 \left(\frac{p}{p_1}\right)^{\frac{n-1}{n}} e^{-K\tau}$$

Therefore:

$$p = p_1 e^{-nK\tau} = p_1 e^{-n\tau/\tau^*} \quad (7)$$

$$or, p = p_1 \left(\frac{\rho}{\rho_1}\right)^{n-1} e^{-K\tau} = p_1 \left(\frac{\rho}{\rho_1}\right)^{n-1} e^{-\tau/\tau^*} \quad (8)$$

After the gas in the sealed system described above is suctioned by the vacuum pump 70 for a period of time $\tau$ beginning with the initial pressure $p_1$, the current pressure P (the absolute pressure) in the sealed system may be obtained from each of the equations (5), (6), (7) and (8). In the equations (6), (7), (8), the change in temperature during suction is taken into account. Correspondingly, the corresponding vacuum degree $p_v$ in the sealed system described above may be obtained by the following equation:

$$p_V = p_{0(a)} - p \quad (9)$$

In the equation (9), $p_{0(a)}$ indicates the pressure of the environment outside the vacuum bag of the sealed system.

In the procedure described herein, the gas is extracted from the sealed system using the vacuum pump 70. The required time $\tau$ that it takes the pressure of the gas in the sealed system to decrease from the initial pressure $p_1$ to p may be obtained according to each of the equations (5), (6), (7), (8), that is, $$\tau = \frac{1}{K}\ln\frac{p_1}{p} = \tau^*\ln\frac{p_1}{p} \quad (10)$$

$$\tau = \frac{1}{K}\ln\frac{p_1}{pT_1}T = \tau^*\ln\frac{p_1}{pT_1}T \quad (11)$$

$$\tau = \frac{1}{nK}\ln\frac{p_1}{p} = \frac{\tau^*}{n}\ln\frac{p_1}{p} \quad (12)$$

$$\tau = \frac{1}{K}\ln\frac{p_1}{p} + \frac{n-1}{K}\ln\frac{\rho}{\rho_1} = \tau^*\left[\ln\frac{p_1}{p} + (n-1)\ln\frac{\rho}{\rho_1}\right] \quad (13)$$

According to the above four equations, with and without consideration of the temperature factor, the required suction duration $\tau$ may be calculated based on different parameters. This suction duration $\tau$ may be calculated by a control system, for control of an vacuumization procedure performed by the vacuum pump 70. The suction duration $\tau$ may also be for reference by an operator, and mutual verification between the suction duration $\tau$ and a detection value of the pressure sensor as described above may be provided.

The above embodiment is further improved in this solution. In the above functional relationship, the influence of an altitude on the pressure is also taken into account.

In a troposphere at 0 to 11000 meters in the air from the ground, considering according to a standard atmospheric condition adopted internationally, each rise of 1000 meters from the sea level may result in an atmospheric temperature drop of 6.5 degrees Celsius. An air temperature of a standard atmosphere at sea level is taken as 15 degrees Celsius.

Assuming that an atmospheric temperature at an altitude of H meters is $T_H$, an initial temperature, an initial pressure and an initial density of air in a manufacturing plant located in a place at the altitude of H meters are expressed as:

$$T_H = T_0 - 0.0065H = 273.15 + 15 - 0.0065H \quad (14)$$

$$p_H = p_0\left(1 - \frac{H}{4.43 \times 10^4}\right)^{5.256} \quad (15)$$

$$\rho_H = \rho_0\left(1 - \frac{H}{4.43 \times 10^4}\right)^{4.256} \quad (16)$$

In the above equations, $\rho_0$ indicates the density of the air, considered as a standard atmosphere, at sea level, $p_0$ indicates a normal atmospheric pressure (101325 Pa) at sea level, $p_H$ indicates an initial pressure of the air in a sealed system at the altitude of H meters, $T_H$ indicates an initial temperature of the air in the sealed system at the altitude of H meters, and $\rho_H$ indicates an initial density of the air in the sealed system at the altitude of H meters.

The sealed system is isolated from the atmosphere after being communicated with the vacuum pump 70. After the vacuum pump 70 keeps running for a time $\tau$ at a constant revolution of $\omega$, the absolute pressure of the air in the sealed system at the altitude of H meters is indicated with p and may be calculated from the following equation (6):

$$p = p_1\frac{T}{T_1}e^{-K\tau} = p_1\frac{T}{T_1}e^{-\tau/\tau^*} \quad (17)$$

Correspondingly, the vacuum degree of the air in the sealed system after the time $\tau$ is expressed as:

$$p_v = p_H - p = p_H - p_H\frac{T}{T_1}e^{-K\tau} = \quad (18)$$

$$p_0\left(1 - \frac{H}{4.43 \times 10^4}\right)^{5.256}\left(1 - \frac{T}{T_0 - 0.0065H}e^{-K\tau}\right)$$

In the case that an expansion procedure of the air in the sealed system is a polytropic procedure with an index of n, it may be derived from the equation (7) that:

$$p = p_H e^{-nK\tau} \quad (19)$$

Correspondingly, a current vacuum degree of the sealed system is expressed as:

$$p_v = p_H - p = p_0\left(1 - \frac{H}{4.43 \times 10^4}\right)^{5.256}(1 - e^{-nK\tau}) \quad (20)$$

In the case that the expansion procedure of the air in the sealed system is a constant temperature procedure, it may be derived from the equation (5) that:

$$p = p_H e^{-K\tau} \quad (21)$$

Correspondingly, a vacuum degree of the sealed system in a constant temperature procedure is expressed as:

$$p_v = p_H - p = p_0\left(1 - \frac{H}{4.43 \times 10^4}\right)^{5.256}(1 - e^{-K\tau}) = \quad (22)$$
$$p_0\left(1 - \frac{H}{4.43 \times 10^4}\right)^{5.256}(1 - e^{-\frac{\tau}{\tau^*}})$$

It may be known from the equation (20) that, the parameters in the functional relationship of the vacuum degree in this case include the standard atmospheric pressure $p_0$, the altitude H, the suction duration $\tau$, the initial volume $V_0$ $$\left(\frac{Q_V}{V_0} = K = \frac{1}{\tau^*}\right),$$

the average suctioned gas volume flow $Q_V$ and the polytropic index n. The influence of the altitude on the pressure and the influence of the altitude on the temperature are reflected in the functional relationship, which makes the grasp of the suction time more accurate.

It may be understood that altitudes in China or even across the world may be different. When the vacuum desorption is controlled, the outside atmospheric pressures at different altitudes are actually inconsistent. If vacuumization control is performed according to a target vacuum degree requirement obtained by a test, the effects of vacuum desorption may be different at different altitudes. For example, when testing at site I, it may be concluded that, after the suction for the suction duration $\tau$ with the average suctioned gas volume flow $Q_V$, the vacuum degree $P_V$ is reached, thus, a better vacuum desorption effect can be obtained. When it comes to site II at a higher altitude, according to the equation (22), $p_H$ may change. If suction is still performed for the suction duration $\tau$ with the average suctioned gas volume flow $Q_V$, a vacuum degree obtained may be inconsistent with the target vacuum degree. Taking the altitude into account, in controlling, a suction error caused by the altitude may be eliminated, so as to allow the control effects in different places to be consistent with one another.

That is, the same sealed systems (all conditions remain unchanged) are mounted at locations where the altitudes H have great differences. If the suction duration $\tau$ is the same, a vacuum degree generated by the vacuum pump 70 may be lower corresponding to a higher altitude. If the sealed systems are mounted at locations at the same altitude H, a vacuum degree generated by the vacuum pump 70 may be higher corresponding to a longer time (quantifying, modeling and identification) of suction of the sealed system by the vacuum pump 70.

Theoretically, the control only based on detection of the vacuum degree in the sealed system may also avoid the influence of the altitude. However, a vacuum degree fed back by a vacuum degree and pressure gauge is not accurate. In the vacuum degree and pressure gauge, $p_0$ in the formula for calculating the vacuum degree is always taken as the standard atmospheric pressure. In the case of a high altitude, according to the formula for calculating the vacuum degree, the read vacuum degree has not yet reached a required vacuum degree, however in fact, a vacuum desorption requirement is met, that is, the inaccuracy of the detection of the vacuum degree caused by the inconsistency of the pressures in different locations may affect control of the vacuum desorption. With this solution, effective control of the vacuumization from place to place may be performed more accurately without being limited by the change of an ambient pressure, thereby making use of time reasonably and avoiding waste of resources.

In the above solution, the influences of multiple factors on the vacuum desorption procedure are taken into account. In order to further clarify the vacuum desorption procedure, the humidity may further be taken into account.

In the case that the surface of the magnetic pole component is stored in a wet air environment, the variations of the above equations may be obtained through the thermodynamic derivation in the case that the change in relative humidity of the wet air is taken as an influencing factor.

Starting from the Dalton's law for a mixed gas in the engineering thermodynamics, the Dalton's law of partial pressures indicates that a total pressure p of the mixed gas is equal to the sum of partial pressures $p_i$ of component gases, that is, $$p = \left(\sum_1^i p_i\right)_{(T,V)}$$

The total pressure of wet air is equal to the sum of a partial pressure $p_a$ of dry air and a partial pressure of water vapor $p_{vw}$, that is, $$p = p_a + p_{vw}$$

A relative humidity of the wet air is indicated with $\varphi$, $$\varphi = \frac{p_{vw}}{p_s}.$$

$p_s$ indicates a partial pressure of the water vapor in saturated wet air.

$$P_a V = m_a R_a T$$
$$\frac{m_a}{V} = \frac{p_a}{R_a T}$$

According to the equation of state of the ideal gas, for the dry air, it is obtained that:

$$P_a V = m_a R_a T$$

-continued $$\frac{m_a}{V} = \frac{p_a}{R_a T}$$

In the above equations, $R_a$ indicates the gas constant of the dry air and is equal to 287 J/kg·K.

For the water vapor in the wet air, it is obtained that:

$$p_{vw}V = m_v R_v T$$

$$p_{vw}V = m_v R_v T$$

$$\frac{m_v}{V} = \frac{p_{vw}}{R_v T}$$

In the above equations, $R_v$ indicates the gas constant of the water vapor and is equal to 461 J/kg·K.

The mass of the dry air in the wet air is indicated by $m_a$ and the mass of the water vapor in the wet air is indicated by $m_v$. Correspondingly, the density of the wet air here is indicated by $$\rho = \frac{m_a + m_v}{V},$$

thus it may be derived that:

$$\rho = \frac{m_a + m_v}{V} = \frac{p_a}{R_a T} + \frac{p_v}{R_v T} = \frac{1}{T}\left(\frac{p_a}{R_a} + \frac{p_v}{R_v}\right) = \frac{1}{T}\left(\frac{p - \varphi p_s}{287} + \frac{\varphi p_s}{461}\right) = \quad (23)$$

$$\frac{1}{T}\left(\frac{\left[p_0\left(1 - \frac{H}{4.43 \times 10^4}\right)^{5.256}\right] - \varphi p_s}{287} + \frac{\varphi p_s}{461}\right)$$

In the above equation, $p_0$ indicates the standard atmospheric pressure (101325 Pa) at sea level.

It should note that: $p_1$, $\rho_1$ in the equation (6)

$$p = p_1 \frac{T}{T_1} e^{-K\tau}$$

and the equation (8)

$$p = p_1 \left(\frac{\rho}{\rho_1}\right)^{n-1} e^{-K\tau}$$

here indicate the initial pressure and the initial density of the gas in the sealed system described above, respectively. The functional relationship of the absolute pressure $p_H$ (the current pressure) reflects the change law of the absolute pressure $p$ in the sealed system after suctioning by the vacuum pump 70 for the suction duration $\tau$.

Correspondingly, the vacuum degree of the air in the sealed system in the forming process for forming the protective layer for the magnetic pole, with respect to an atmospheric pressure $p_H$ of a location where a manufacturing plant at an altitude of H is located, is expressed as:

$$p_v = p_H - p = p_H - p_H \frac{T}{T_H} e^{-K\tau} =$$

-continued $$p_H\left[1 - \frac{T}{T_H}e^{-K\tau}\right] = p_0\left(1 - \frac{H}{4.43 \times 10^4}\right)^{5.256}\left[1 - \frac{T}{T_H}e^{-K\tau}\right] =$$

$$p_0\left(1 - \frac{H}{4.43 \times 10^4}\right)^{5.256}\left[1 - \left(\frac{\rho}{\rho_H}\right)^{n-1}e^{-K\tau}\right] =$$

$$p_0\left(1 - \frac{H}{4.43 \times 10^4}\right)^{5.256}\left[1 - \left(\frac{\rho}{\rho_H}\right)^{n-1}e^{-\tau/\tau^*}\right]$$

That is, the vacuum degree is expressed as:

$$p_v = p_0\left(1 - \frac{H}{4.43 \times 10^4}\right)^{5.256}\left[1 - \left(\frac{\rho}{\rho_H}\right)^{n-1} \times e^{-\frac{\tau}{\tau^*}}\right]$$

where, $$\rho_H = \frac{1}{T}\left\{\frac{\left[p_0\left(1 - \frac{H}{4.43 \times 10^4}\right)^{5.256}\right] - \varphi p_s}{287} + \frac{\varphi p_s}{461}\right\}$$

The vacuum degree of the air in the sealed system in the forming process for forming the protective layer for the magnetic pole, with respect to the standard atmospheric pressure $p_0$ at sea level (the corresponding standard atmospheric density $\rho_0$ at sea level), is expressed as:

$$p_v = p_0\left[1 - \left(\frac{\rho}{\rho_H}\right)^{n-1} \times e^{-\frac{\tau}{\tau^*}}\right]$$

In this embodiment, the influences of the initial density and the relative humidity of the air on the vacuum degree are emphatically reflected. It may be known from the above equation that, when it is rainy or sunny, the vacuum desorption may also be effected, which facilitates the operator predetermining a working hour according to an actual weather situation. In other words, the time required for the vacuumization is different at different temperatures, different altitudes and different relative humidities. To which extent the vacuumization is performed before injection of the impregnation liquid for achieving desorption effect may be learned from the above relationship.

In the above embodiment, desorption by the vacuumization for reducing the bubbles is described. In this regard, further improvements may be made.

Figure 8:
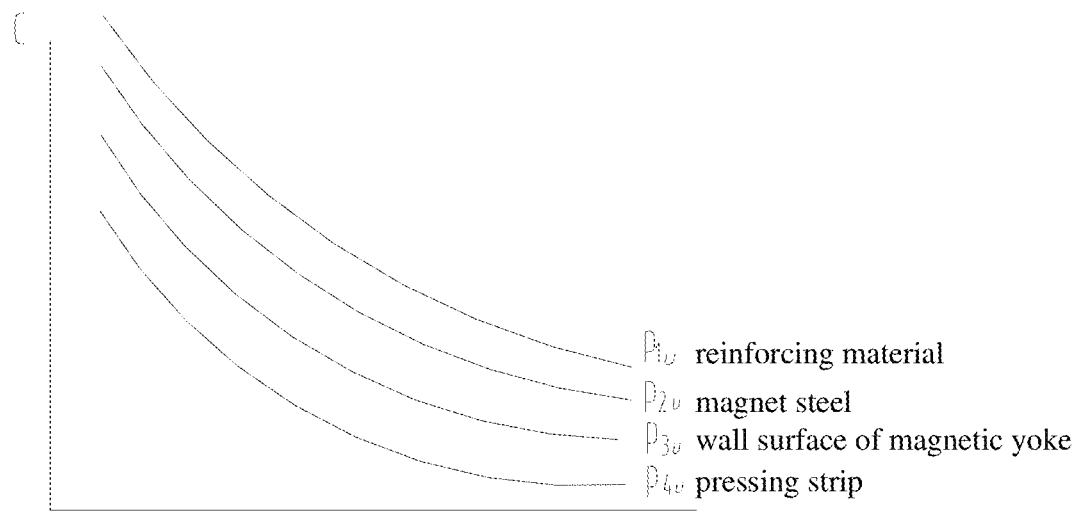
FIG. 8 is a relational diagram showing that the adsorption amount of air adsorbed on the solid surface of the magnetic pole component changes as the temperature of the solid surface increases.
Figure 9:
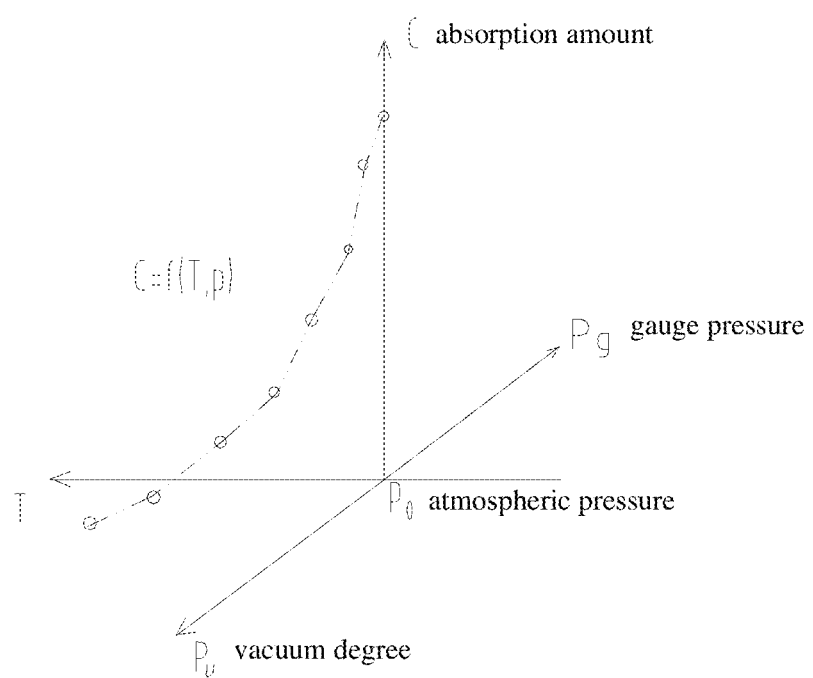
FIG. 9 is a relational diagram showing that the adsorption amount of air adsorbed on the solid surface of the magnetic pole component changes as each of the vacuum degree and the temperature of the solid surface increases.

Reference is made to FIGS. 8 to 9, FIG. 8 is a relational diagram showing that the adsorption amount of air adsorbed on the solid surface of the magnetic pole component changes as the temperature of the solid surface increases, and FIG. 9 is a relational diagram showing that the adsorption amount of air adsorbed on the solid surface of the magnetic pole component changes as each of the vacuum degree and the temperature of the solid surface increases. In conjunction with FIG. 6 and FIG. 8, an integrated change trend of the adsorption amount with respect to the temperature and the vacuum degree is shown more clearly. In these figures, Pv indicates a vacuum degree, C indicates an adsorption amount of air, P0 indicates a standard atmospheric pressure, and Pg indicates a gauge pressure, by which the absolute pressure in the vacuum bag 25 is higher than an atmospheric pressure of a natural environment where an exterior of the vacuum bag is located.

Similarly to a vacuum desorption test, after a research, a temperature rising desorption test is also conducted. It may be seen from the figure that, for each of the reinforcing material 242 of the protective layer 242' the magnet steel 22, the wall surface of the magnetic yoke 21 and the pressing strip 26 for fixing the magnet steel 22 included in the magnetic pole component of the permanent magnet motor, the adsorption amount of air adsorbed by the solid surface decreases as the temperature increases. Therefore, in addition to the vacuum desorption, in the present application, heating desorption may also be performed together, that is, the adsorption amount of air is reduced by increasing the temperature, thereby reducing the bubbles from the source.

It may also be seen from FIG. 8 that there are differences having consistency among adsorption capacities of the reinforcing material, the magnet steel, the wall surface of the magnetic yoke and the pressing strip are different. Since the reinforcing material 242 is a fibrous porous material, the air is not apt to be desorbed from the reinforcing material 242. Therefore, during the desorption process, the desorption from the reinforcing material 242 is considered as a minimum qualified limit. That is, the temperature should meet the desorption requirement of desorption from the reinforcing material 242, correspondingly, the desorption requirements of desorption from the magnet steel 22, the wall surface of the magnetic yoke 21 and the pressing strip 26 are also met.

Reference is further made to FIG. 7. As shown in the figure, there are multiple types of devices for performing heating desorption. Three types of heating structures are shown in the figure, which are an electric heating film 31, a far-infrared heating structure and a microwave heating structure, respectively.

In the figure, the rotor is in an outer rotor structure. The electric heating film 31 is laid to an outer wall of the magnetic yoke 21. The electric heating film 31 is in close contact with the outer wall of the magnetic yoke 21 for heating. The electric heating film 31 may perform uniform heating and is suitable for heating the magnetic yoke 21. In addition, a heat insulation layer 32 may be further provided at the outer wall of the electric heating film 31, and the heat insulation layer 32 makes the heating of the magnetic yoke 21 more energy-saving. At the same time that the magnetic yoke 21 is heated, the magnet steels 22 and the reinforcing material 242 at an inner side of the magnetic yoke 21 are similarly heated by heat conduction, thereby achieving temperature rising desorption of the air.

A far-infrared heat source 34 is also shown in the figure. The far-infrared heat source 34 is provided in an inner cavity of the outer rotor, for heating an outer surface of the vacuum bag 25 of the magnet steel 22 laid at the inner side of the magnetic yoke 21. The vacuum bag 25 is embodied as being made from a material suitable to be penetrated by an infrared ray. The vacuum bag 25 with a high penetration rate is selected. A far-infrared ray, with a wavelength, of which the flow guide net 241 and the demoulding cloth in the vacuum bag 25 may each have a high absorptivity is selected to be emitted.

A microwave device includes a microwave controller, a radiant heater 35 (that is, a heating structure for inputting a microwave and in a horn shape in the figure) and a water storage sponge. Sealing and shielding thermal insulation covers 33 are provided at an upper end and a lower end of the magnetic yoke 21, for sealing and thermal isolation. In one aspect, leakage of the microwave is prevented, which ensures the safety. In another aspect, dissipation of the heat is prevented, and the heating effect is ensured. The radiant heater 35 for inputting the microwave emits microwaves to the surface of the vacuum bag 25, for heating an interior of the vacuum bag 25. Each of the magnetic yoke 21 and the magnet steel 22 has a metal surface. After the microwaves are emitted to the magnetic yoke 21 and the magnet steel 22, the microwave may be rebounded. Here, the water storage sponge is provided at an inner side of the radiant heater 35, and the moisture in the water storage sponge has a high absorptivity of the microwave. Providing the water storage sponge at a horn-shaped housing of the radiation heater 35 may contribute to absorption of the rebounded microwave, so as to prevent the rebounded microwaves from damaging a microwave emission head. Theoretically, in combination with a distance between the microwave emission head and the magnetic yoke 21 as well as a distance between the microwave emission head and the magnet steel 22, the frequency and the wavelength of the microwave are set by the microwave controller, which may also prevent the microwave from damaging the emission head. In the figure, the radiant heater 35 is provided in the horn shape, which facilitates the water storage sponge absorbing the rebounded microwave. Of course, the radiant heater 35 is not limited to this structure. Compared with other heating methods, with the method of heating by the microwave input by the radiant heater 35, a better desorption effect may be achieved, since the liquid has a high absorptivity of the microwave. The moisture is heated by the microwave in time and promptly, thus, the moisture may be vaporized and desorbed rapidly under the action of the microwave.

In addition to far-infrared heating, microwave heating or heating with the electric heating film described above, the desorption effect may be further improved by an ultrasonic device. The ultrasonic device may input an ultrasonic wave into the vacuum bag 25. In this case, the injection port 251 provided in the sealed system may serve as an ultrasonic input port. The ultrasonic device may alternatively directly emit the ultrasonic wave to the surface of the vacuum bag 25, and in this case, it is preferable that a vacuum environment is established in the sealed system, such that the ultrasonic wave may be transmitted to the magnet steel 22 and the magnetic yoke 21 when acting on the surface of the vacuum bag 25. The ultrasonic wave may provide certain stimulation and vibration, which facilitates the bubbles in the sealed system escaping out, thereby achieving the desorption. In the case that the frequency of the ultrasonic wave exceeds a certain frequency, a certain heating desorption effect may also be achieved.

According to the actual working conditions in conjunction with the cost, control and other factors, the four desorption methods described above may be performed individually or at least two of the four desorption methods may be performed in combination with one another. The process steps for the heating desorption and the ultrasonic desorption may be performed during the vacuum desorption, or may alternatively be performed before or after the vacuum desorption, and the orders of performing the heating desorption and the ultrasonic desorption are not limited. However, in the case that the process steps for the heating desorption and the ultrasonic desorption are performed at the same time as or before the vacuum desorption, performing of the above desorption methods may cause the temperature in the sealed system to change, the vacuum desorption may be affected by the change of the temperature. Thus, a temperature parameter involved in a control procedure for the vacuum desorption may be embodied as the heated temperature.

Reference is further made to FIG. 7. In FIG. 7, the injection port 251 is further connected to an air inlet filter 52 and an air heater 51. During suction of the vacuum pump 70, heated and filtered dry air may be extracted into the sealed system. The step of passing hot air may be carried out after the vacuum desorption described above, that is, after the vacuum desorption, clean dry air is further passed to take possible residual impurities and water vapor and the like out, for more thorough desorption. In addition, the entire sealed system may be heated well by passing of the hot air, making preparation for subsequent injection of the impregnation liquid.

An outlet air filter 60 may be further provided between the discharge port and the vacuum pump 70 to prevent the impurities or water vapor or the like suctioned out from adversely affecting the performance of the vacuum pump 70. In addition, desorption procedure measurement may be performed on the air which is suctioned out. A desorption process measurement device 61 shown in FIG. 7 may be provided at the position of the outlet air filter 60. The desorption process measurement device 61 may measure the contents of the impurities and the water vapor (mainly the water vapor) flowing through the air, thereby monitoring the effect of the desorption procedure. When the content of the water vapor is reduced to a certain value, it indicates that the required desorption target is achieved and that the desorption is completed, thus, the next injection of the impregnation liquid may be carried out. The desorption process measurement device 61 may specifically be a water vapor content analyzer. The water vapor is condensed for example by a simple device and then detected by a test paper.

In this solution, the step of passing the hot air is performed after the vacuum desorption. Of course, the step of passing the hot air may alternatively be performed at the same time as the step of microwave heating, the step of far-infrared heating, the step of heating by the electric heating film, the step of emission of the ultrasonic wave and the step of vacuum desorption described above.

The above solution illustrates that how to perform the desorption process before the injection of the impregnation liquid so as to reduce the bubbles that may be generated during the injection of the impregnation liquid as far as possible. In the following embodiment, the procedure of injecting the impregnation liquid is further discussed based on the above solution.

Figure 10:
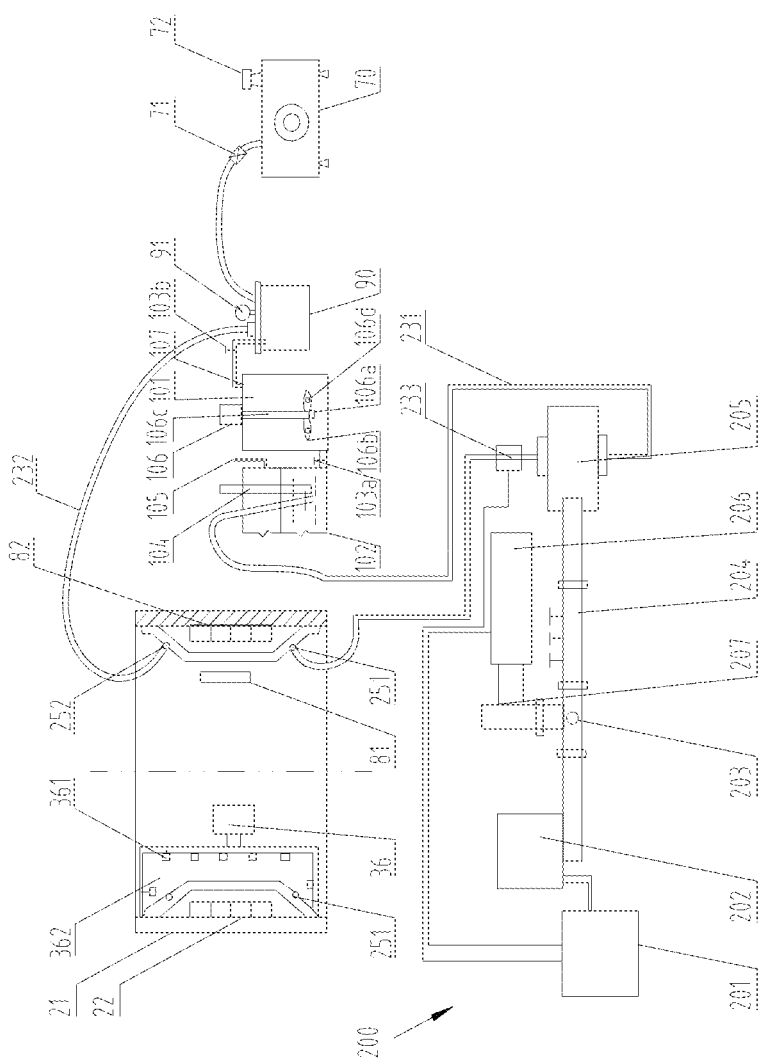
FIG. 10 is a schematic view showing the structure of an embodiment of a vacuum impregnation process system according to the present application.

Reference is made to FIG. 10, which is a schematic view showing the structure of an embodiment of a vacuum impregnation process system according to the present application.

In this embodiment, the impregnation liquid injected is a mixed liquid including resin and a curing agent. The resin is stored in a resin system tank and mixed and prepared with the curing agent in proportion for use. The resin system tank specifically includes a resin stirring tank 101 and a resin output tank 102 which are communicated with each other. The resin stirring tank 101 is located upstream of the resin output tank 102. A stirrer is provided inside the resin stirring tank 101. The system is further provided with an electric motor 106. The electric motor 106 may drive the stirrer to rotate for stirring before the resin is injected. The procedure of stirring facilitates bubbles that may be contained in the resin in the resin stirring tank 101 escaping out, thereby preventing the bubbles from entering the sealed system. A communication pipe is provided between the resin stirring tank 101 and the resin output tank 102. The stirred resin flows into the resin output tank 102. The communication pipe may be provided with a first regulating valve 103*a* for adjusting the amount of the resin entering the resin stirring tank 101. When the first regulating valve 103*a* is closed, the stirring tank 101 may be isolated from the output tank 102.

In order to increase the escaping speed and the escaping amount of the bubbles, the above stirrer may be a heating stirrer which is configured to stir while heating. According to the Henry's law that may reflect the law of the solubility of gas in liquid, the solubility of the gas in the resin may be reduced by increasing the temperature, thereby accelerating the escaping of the bubbles.

Specifically, as shown in FIG. 9, an output shaft of the electric motor 106 is a hollow shaft 106*c*. Extension wires of a winding of the electric motor 106 extend downwardly from a hollow cavity of the hollow shaft 106*c* and form an electrical circuit. A three-phase winding corresponds to three stirring blades 106*b*. A heating resistor 106*d* is provided inside the stirring blade 106*b*. The extension wires may service a power supply for the heating resistor 106*d*. Thus, when the electric motor 106 is started, a heating function may be achieved. In this structure, electrical wires of the winding of the electric motor 106 are subtly elongated and extend beyond the electric motor 106 to serve as a power source, thus the electric energy from the electric motor 106 is introduced to the position of the stirring blade 106*b* at a lower end. Thus, an electric heating function of the stirring blades 106*b* in a limited space is achieved.

In addition, in order to further facilitate discharging of the bubbles, an ultrasonic high-frequency vibration emission head 106*a* is further provided. As shown in FIG. 10, the electric motor 106 carries an ultrasonic wave emitting device. The ultrasonic wave emitting device transmits the power to the ultrasonic high-frequency vibration emission head 106*a* located at a bottom of the hollow shaft 106*c* through the hollow shaft 106*c* of the electric motor 106. The emitted ultrasonic wave contributes to exciting the bubbles for discharging the bubbles, and may suppress the resin from accumulating on the stirring blades 106*b*, thereby ensuring the service life of the stirring blades 106*b*. An alternating current is generated by the electric motor 106. In order to allow the electric motor 106 to drive the ultrasonic high-frequency vibration emission head 106*a*, a micro frequency converter, i.e., an electric energy processing module, is provided inside the hollow shaft 106*c*, thus, the voltage and the output frequency of the micro frequency converter are adjustable, so as to allow the frequency and the voltage of the electric power supplied to an actuator of the ultrasonic high-frequency vibration emission head 106*a* to be adjustable. In this case, the above extension wires are connected to the micro frequency converter to form a circuit, and the electric energy is output from the micro frequency converter to the stirring blades 106*b* and the ultrasonic high-frequency vibration emission head 106*a*.

An ultrasonic defoaming and vibrating bar 104 is further provided in the resin output tank 102. The principle of the ultrasonic defoaming and vibrating bar 104 is the same as the principle of the ultrasonic high-frequency vibration emission head 106*a* located inside the resin stirring tank 101, similarly for further improving the defoaming effect.

In addition, an upper portion, specifically a top, of the resin stirring tank 101 is provided with a first air outlet 107. The first air outlet 107 is communicated with the vacuum pump 70, and may specifically be communicated with the air filter 60 as shown in the figure, thus, the air escaping out after stirring and heating may be suctioned and taken away by the vacuum pump 70, for accelerating the discharge of the gas inside the resin stirring tank 101. A second regulating valve 103*b* may be provided between the first air outlet 107 and the outlet air filter 60. Here, the second regulating valve 103*b* may be used to isolate the stirring tank 101 from the vacuum pump 70, for example, a passage between the stirring tank 101 and the vacuum pump 70 may be cut off in the case that suction is not required after the impregnation is completed or the impregnation liquid is prepared. The resin outlet tank 102 is provided with a second air outlet 105, which also facilitates the discharging of the gas that further escapes out after the ultrasonic vibration. In fact, the second air outlet 105 may alternatively be communicated with the vacuum pump 70. Of course, here, the second gas outlet 105 is not communicated with the vacuum pump 70, but rather directly connected to the atmosphere, which is good for the establishment of the pressure difference, thereby facilitating the impregnation liquid inside the output tank 102 being suctioned and input into the sealed system.

The defoamed resin described above is injected into the sealed system from the injection port 251 through an input pipeline 231. In this embodiment, the resin in the input pipeline 231 is further preheated, which allows the resin to enter the sealed system after having a suitable temperature (in general, 30 degrees to 35 degrees) and to have an appropriate viscosity, thereby achieving good impregnation effect.

In this embodiment, the device for preheating the resin in the input pipeline 231 is a microwave preheating device 200. The microwave preheating device 200 includes a microwave source 202, a waveguide, a stub tuner 204, a cylindrical high-frequency heat generation electrode, a circulator 203, a water load 207 and a cooling system 206 for the water load 207, and a microwave control unit 201. The working principle of the microwave preheating device 200 may be understood with reference to the conventional technology.

The microwave preheating device 200 is provided with a resin chamber 205. The input pipeline 231 is communicated with the resin chamber 205. A microwave from the microwave preheating device 200 is emitted into the resin chamber 205. Providing the resin chamber 205 facilitates safe heating with the microwave. Here, it should be specially noted that, in this embodiment, a non-metallic screen plate is preferably provided inside the resin chamber 205. The screen plate is provided with multiple screen openings. After the resin enters the resin chamber 205 through the input pipeline 231, the resin continues flowing to pass through the screen plate and pass through the screen openings. In this way, when the resin flows through the resin chamber 205, the resin may be screened into several drop-shaped resins by the screen plate. When the microwave is emitted to the multiple drop-shaped resins, the drop-shaped resins may be heated. Compared with other heating methods, this heating method makes the resin be heated very uniformly, thereby facilitating smooth performing of the subsequent impregnation procedure.

The microwave shown in the figure is incident from a side surface of the resin chamber 205. Apparently, the present application is not limited to this structure. The microwave may alternatively be incident toward a direction in which the resin enters to be opposed to the drop-shaped resins, thereby enhancing the heating effect. The resin in the input pipeline 231 may be input into the sealed system from top to bottom or from bottom to top.

The resin heated by the microwave continues to enter the input pipeline 231. In this case, a flowmeter 233 may be provided to detect a transportation speed of the resin. According to the magnitude of the transportation speed, the viscosity of the resin is adjusted, and for example, the heating power of the microwave is also adjusted. A measurement result of the flowmeter 233 in FIG. 10 is fed back to the control unit 201 of the microwave preheating device 200, so as to allow the control unit 201 to adjust the intensity of the microwave according to the transportation speed.

In the impregnation process system, the output port of the sealed system is connected to an output pipeline 232. The output pipeline 232 is connected to the vacuum pump 70. The output pipeline 232 may be provided with a resin collector 90. An injection pressure for the impregnation liquid is generated through suction by the vacuum pump 70. During the injection, the resin may be suctioned out of the output port and enter the resin collector 90, thus the provision of the resin collector 90 may prevent the resin from being suctioned into the vacuum pump 70 to affect the performance of the vacuum pump 70.

During the injection of the impregnation liquid, vacuum suction by the vacuum pump 70 is to establish a pressure gradient for filling with the resin. A further improvement of this solution is to perform a "variable pressure" control of the injection procedure. In this solution, during the suction by the vacuum pump 70, the drive motor 72 for the vacuum pump 70 carries out a variable frequency adjustment by the frequency convertible governor. The rotation speed of the drive motor 72 is changed to adjust the average suctioned gas volume flow of the vacuum pump 70, thereby allowing the pressure in the sealed system to increase and decrease. That is, the average suctioned gas volume flow of the vacuum pump 70 may be increased for a predetermined time and then decreased for the predetermined time. The procedure of increasing and then decreasing of the average suctioned gas volume flow described above is repeated several times, thereby achieving the "variable pressure" control. The impregnation liquid may be cured over a period of time. In general, it is required to complete the injection of the impregnation liquid within 20 minutes to 30 minutes. In the case the above "variable pressure" control is carried out, the predetermined time for increasing and decreasing may be set based on a total period of time for impregnation and may be determined specifically according to an actual situation, so as to facilitate full impregnation.

When a low pressure is generated during suction by the vacuum pump 70, the resin may be driven to flow into the sealed system for a short time. However, when the pressure is remained low for a long time, the reinforcing material 242 may tightly adhere to the magnet steels 22 and the magnetic yoke 21. In the case, the sealed system have a small volume, the flow of the resin may stagnate, that is, although a low pressure is established and thus a pressure gradient is generated, a phenomenon of poor flowability may occur subsequently. Therefore, in this solution, after suction at a high rotation speed for a period of time, the rotation speed of the vacuum pump 70 is reduced so as to achieve relaxing effect of releasing the restraint. The impregnation liquid previously injected self-sags under the force of gravity, such that a lower unfilled empty region due to flowing beyond of the impregnation liquid is filled, which is equivalent to addition of "backflow". Then, when the rotational speed is increased once again, a low pressure is established again, and the flow is driven and guided, thus, raising effect of raising the resin is achieved. When the vacuum bag 25 is suctioned to be further tightened again, a certain radial force is generated correspondingly, that is, the impregnation liquid may be radially squeezed by the vacuum bag 25, thereby facilitating the impregnation liquid filling the reinforcing material 242 and a gap between the reinforcing material 242 and the inner wall of the magnetic yoke 21.

Thus, in this solution, during the injection of the impregnation liquid, the "variable pressure" control is performed, which may reduce the empty region and allows the impregnation liquid to fill all the gaps as far as possible. Therefore, this solution is a preferred embodiment. A filling progress measurement device 82 may be provided to monitor a filling progress of the gap between the magnet steel 22 and the inner wall of the magnetic yoke 21. Moreover, a thickness measurement device 81 for the protective layer 242' may be further provided. The filling progress measurement device 82 and the thickness measurement device 81 may assist in determining whether the step of injection of the impregnation liquid is completed or not. The filling progress measurement device 82 may specifically include multiple sensors provided at the reinforcing material 242 to establish a bridge, so as to monitor the degree of injection of the impregnation liquid, for example, whether there is a gap that is not filled. The thickness measurement device 81 may specifically be a thickness gauge.

After the step of the injection of the impregnation liquid is completed, a curing procedure is started.

During the curing, heating is required. As described above, the temperature of the resin is maintained at 30 degrees Celsius to 35 degrees Celsius during injection of the resin. At a curing stage, the temperature is typically maintained at 80 degrees Celsius to 120 degrees Celsius. Similarly to the heating desorption device described above, when heating at the curing stage, a far-infrared heating device, a microwave heating device, the electric heating film 31, an ultrasonic wave emitting device 36 and the like may also be employed, as shown in FIG. 10.

The ultrasonic wave emitting device 36 inputs wave energy into the protective layer 242' formed after the injection of the resin into the reinforcing material 242, which may apply a "cavitation effect" on the protective layer 242' and breaks the gas left in the protective layer 242' and the bubbles carried by the resin, thereby further reducing the residual amount of the bubbles at the curing stage. The ultrasonic wave emitting device 36 is provided with several ultrasonic wave emission heads 361 facing an outer side of the vacuum bag 25. An ultrasonic wave emission cavity 362 is formed between a housing of the ultrasonic wave emitting device 36 and the vacuum bag 25.

The curing procedure actually includes three temperature control stages, respectively, a temperature increase stage, a constant temperature stage and a temperature decrease stage, and is a stepped temperature control procedure. At the temperature increase stage, the temperature is increased from a resin injection temperature to a required curing temperature, as described above, the temperature is increased from a temperature ranging from 30 degrees Celsius to 35 degrees Celsius to a temperature ranging from 80 degrees Celsius to 120 degrees Celsius. After the temperature is increased to the required temperature, the constant temperature stage is carried out for a period of time, so as to facilitate reaction, gelation and curing of the curing agent and the resin. Finally, the temperature decrease stage is started. After the temperature decrease stage is carried out for a period of time, the vacuum pump 70 stops suctioning correspondingly. In this solution, the average suctioned gas volume flow of the vacuum pump 70 is gradually decreased, that is, a "sliding pressure control" after curing is performed, so as to prevent a sudden change in stress caused by sudden temperature decrease from affecting the life of the protective layer 242'. The time of the entire curing stage may be controlled to 7 hours to 8 hours.

Figure 11:
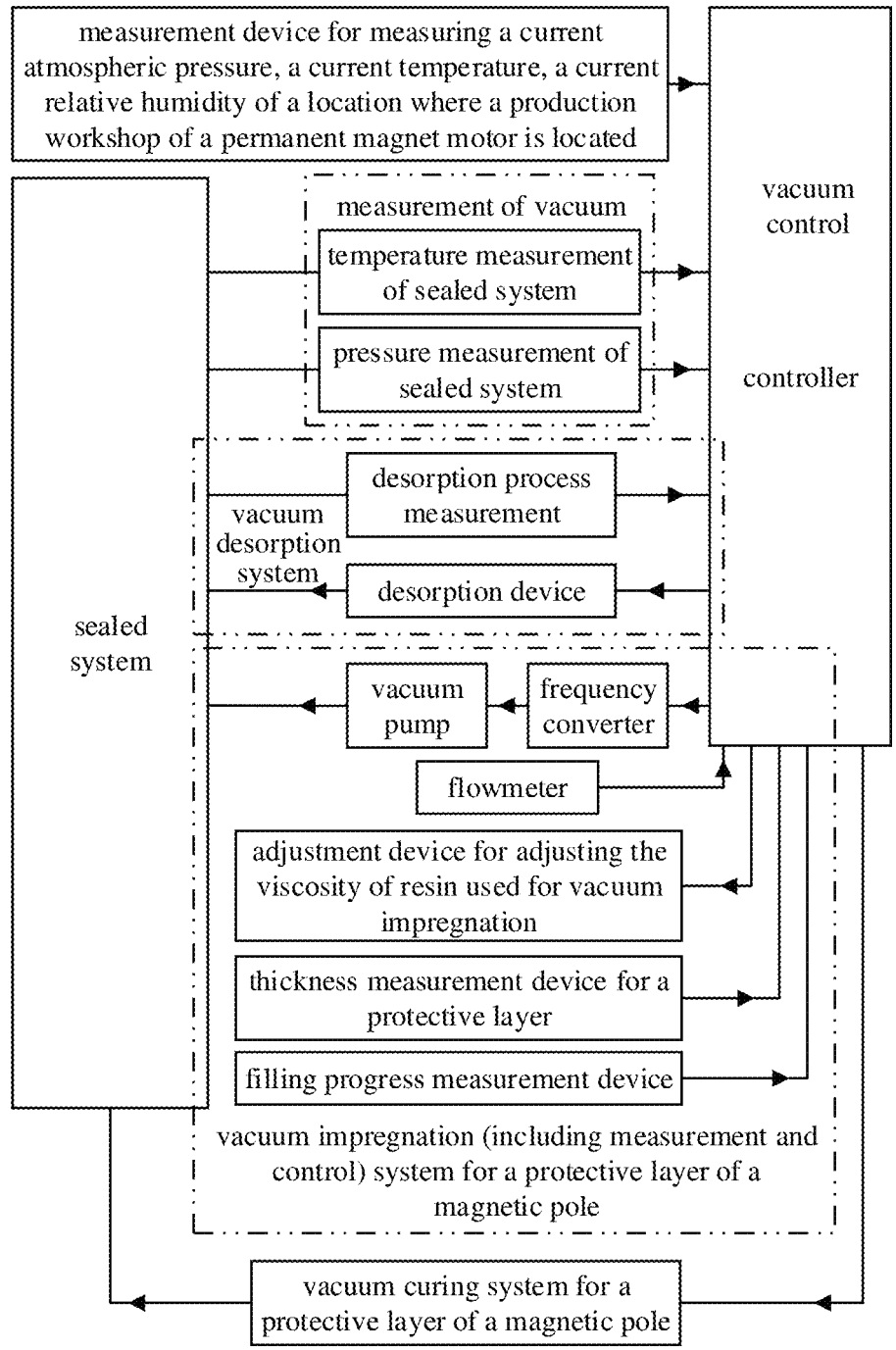
FIG. 11 is a block diagram of a control system for an embodiment of a vacuum desorption, impregnation and curing process according to the present application.
Figure 12:
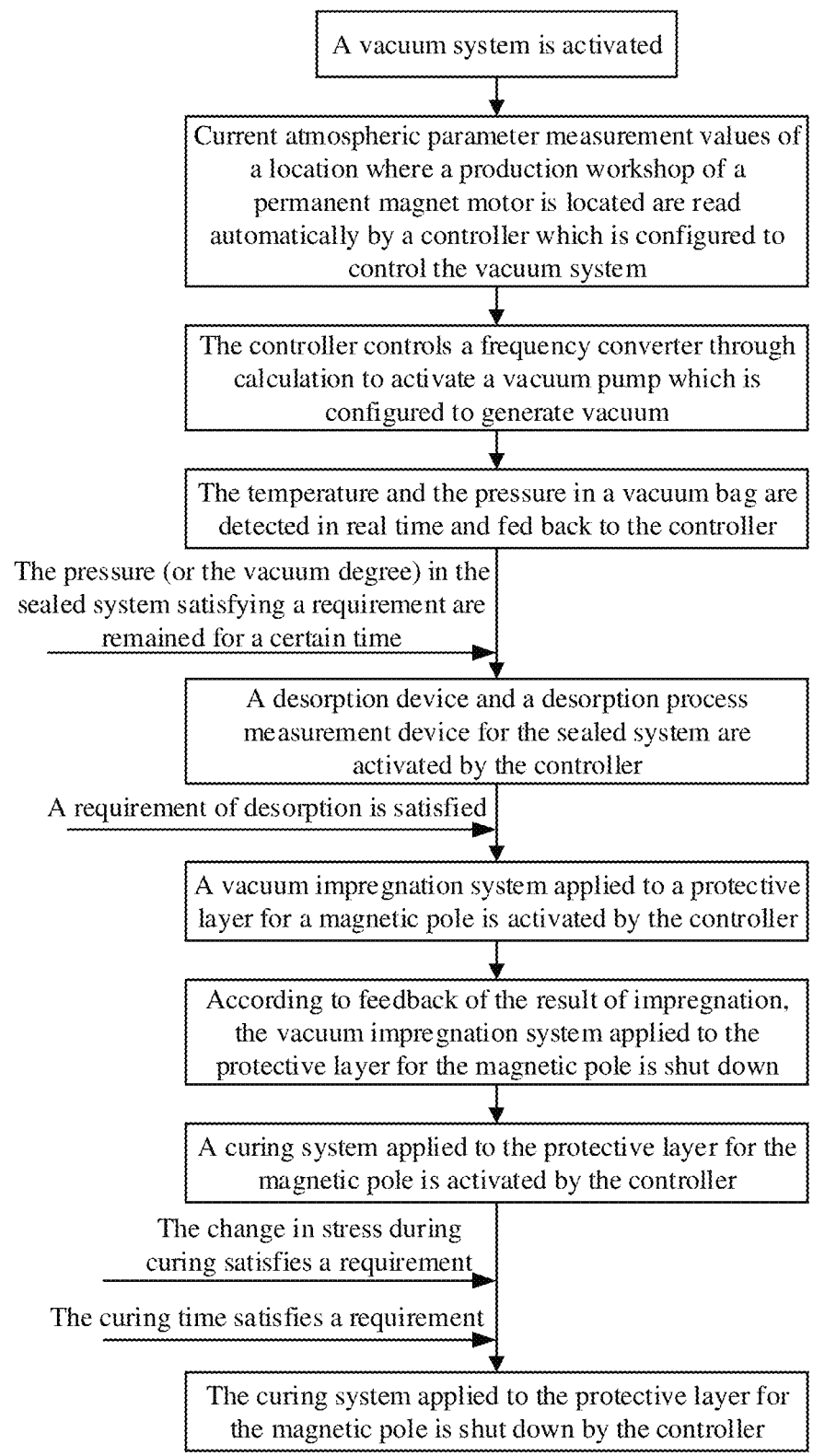
FIG. 12 is a flow chart showing a control flow for an embodiment of a vacuum desorption and vacuum impregnation process according to the present application.

Finally, reference is made to FIG. 11 and FIG. 12. FIG. 11 is a block diagram of a control system for an embodiment of a vacuum desorption, impregnation and curing process according to the present application, and in the figure, the entire vacuum desorption, impregnation and curing process system is divided into three dashed blocks, which respectively indicates a vacuum desorption system, a vacuum impregnation (including measurement and control) system for the protective layer of the magnetic pole and a vacuum curing system for the protective layer of the magnetic pole, so as to more clearly sort devices to which the systems relate in different stages during the formation of the protective layer 242', thus, systematic understanding of the process system for forming the entire protective layer 242' is facilitated, which is specifically mentioned in the foregoing. FIG. 12 is a flow chart showing a control flow for an embodiment of a vacuum desorption and vacuum impregnation process according to the present application.

In conjunction with the above embodiments, the forming process for forming the flexible molded protective layer according to this solution may be performed by the following steps.

A vacuum system (including the vacuum pump 70 and a controller for the vacuum pump 70, and the controller for the vacuum pump 70 is a controller for the whole system) is activated. In this case, current atmospheric parameter measurement values of a location where a production workshop of the permanent magnet motor is located are automatically read by the controller.

Various functional relationships, such as the equations (5) to (8), (20), (22), (23), for obtaining the vacuum degree as well as the variations of the functional relationships which are derived according to the above embodiment may be pre-stored in the controller, and control is performed according to the parameters actually detected. Here, the detected atmospheric parameter measurement values include the atmospheric pressure, the temperature, the relative humidity and the altitude, and may be substituted into the equation (23), thus, correction may be made according to the parameters. The required suitable average suctioned gas volume flow of the vacuum pump 70 and the suction time are calculated, and a closed-loop control of the vacuum pump 70 is further carried out.

After the vacuum pump 70 is activated to operate, a pressure sensor 42, a temperature sensor 41 and a temperature sensor 43 provided may output the temperature and the pressure in the sealed system detected to the controller in real time, thereby providing reference for the staff. Thus, mutual calibration and monitoring is formed. For example, when the vacuum bag 25 leaks, after the vacuum pump is activated, the pressure value may change abnormally, which contributes to determining whether there is a fault or not. Therefore, before the vacuum desorption, first, it is determined whether the pressure value or the vacuum degree in the sealed system satisfy the requirements, that is, whether a certain vacuum is established. If certain pressure and vacuum degree requirements are satisfied, it indicates that the sealed system does not leak or have other faults, thus, the vacuum desorption may be formally performed.

During the vacuum desorption, microwave heating and the like described previously may be performed at the same time, which will not be described. After the vacuum desorption is performed for a period of time, the pressure or the vacuum degree in the sealed system may reach a target value, which may be obtained by detecting the pressure or the vacuum degree. In addition, the contents of the water vapor and the like contained in the extracted gas measured by the desorption process measurement device 61 may also be used in conjunction with the pressure or the vacuum degree in the sealed system to determine whether a target of the vacuum desorption is reached, and if the target is reached, the procedure of vacuum desorption may be ended.

Hot air desorption, that is, passing of the heated air described above, continues to proceed, and the extracted water vapor and other impurities and the like are measured by the desorption process measurement device 61 to determine when the hot air desorption may be ended. It has also been discussed in the foregoing that the hot air desorption and the vacuum desorption may alternatively be carried out simultaneously. FIG. 11 exemplarily shows that the hot air desorption is performed subsequent to the vacuum desorption.

After all the desorption processes are completed, a vacuum impregnation system is activated by the controller. During the impregnation, the flowmeter 233 and the thickness measurement device 81 for the protective layer 242' and the filling progress measurement device 82 may feed information back to the controller of the entire system in real time, to adjust a resin viscosity adjustment device (for example, the microwave preheating device 200 shown in FIG. 10) and to adjust the frequency convertible governor of the motor 72 for driving the vacuum pump 70 according to a current filling condition, thereby ensuring full impregnation with the resin. In addition, the controller performs the "variable pressure" control described above by controlling the frequency convertible governor. A vacuum pump regulating valve 71 is further provided in the output pipeline 232 between the vacuum pump 70 and the sealed system. The vacuum regulating valve 71 may also be used to adjust the suction capacity of the vacuum pump 70 for standby. In addition, before the vacuum pump 70 is activated, the vacuum pump regulating valve 71 may be closed. At the beginning of the activation of the vacuum pump 71, it is possible to test whether leak is present in the vacuum pump 70 itself, based on the change of the reading of a vacuum gauge 91.

After the impregnation is ended, the curing system is activated by the controller. When the curing time reaches a set time and the change in stress in the curing procedure satisfies the set value (a piezoelectric sensor may be provided to detect the change in stress), the curing operation may be stopped, thus, the entire vacuum desorption, impregnation and curing process is ended.

Multiple heating methods are mentioned in the above embodiments, and the multiple heating methods may be adopted in both the desorption process and the curing process. In the case that the multiple heating methods are used in combination with one another, the efficiency of the combination may be taken into consideration to avoid the waste of resources. Taking providing the far-infrared heat source 34 and the electric heating film 31 for heating as an example, the far-infrared heat source 34 is provided at an inner side of a cylindrical wall of the magnetic yoke 21, for far-infrared heating toward the outer side of the vacuum bag 25. In the procedure of the far-infrared heating, the frequency of the ray generated by heat radiation of the heat source is adjusted to adapt to selective absorption, thereby facilitating an absorptivity with the highest efficiency. The frequency of the ray may be determined by conducting a test. In a test method, spectral radiation is emitted according to the material used for the vacuum bag 25, to obtain the result of selective absorption of an inside surface of the vacuum bag 25; taking the influences of the flow guide net 241 and the inside vacuum bag 25 on the absorptivity into account, the absorptivity of each of the vacuum bag 25 and the flow guide net 141 of the heat radiation is obtained, thereby obtaining an equivalent "absorption coefficient" of the entire protective layer 242' during filling, impregnation and infiltration with the resin, at the beginning of curing and in the entire curing procedure. According to this absorption coefficient, the radiation power and the radiation heating law of the far-infrared heat source 34 are determined. This measure is to avoid manufacturing waste due to excessively great power of the far-infrared heat source 34 and to avoid affecting the efficiency of the curing procedure due to excessively small power and insufficient power.

For the curing process, a piezoelectric sensor may be provided to obtain the change of the thermal stress caused by the protective layer 242' on the surface of the magnet steel 22 and the surface of the pressing strip 26 during curing, thereby obtaining an optimum (corresponding to minimum thermal stress) temperature increase speed which is suitable for the curing of the resin together with the reinforcing material 242. This requires two types of heat sources at a periphery of the rotor in FIG. 10: a "flexible heat source"— the electric heating film 31—located inside the heat insulation layer 32 at the outer wall of the magnetic yoke 21 of the rotor and a heat source (the far-infrared heat source 34) at the inner side of the magnetic yoke 21. The "flexible heat source" transmits the heat to an outer side of the rotor in a manner of "heat conduction" by means of being contact with the rotor. The heat source (far-infrared heat source 34) at the outer side of the magnetic yoke 21 transmits the heat to an outer wall of the rotor by radiation (an electromagnetic wave). Therefore, irrespective of the manner in which the heat is given at the outer side of the rotor, there is an issue that whether the manner in which the heat is given at the outer side of the rotor matches the manner in which the far-infrared heat source 34 at the inner side of the rotor transmits the heat. In an embodiment to address the issue, the temperatures at two sides of the protective layer 242' are consistent, that is, the temperature sensor 41 at the inner side of the vacuum bag 25 and the temperature sensor 43 on the surface of the magnet steel 22 are maintained consistent at the curing stage (7 hours to 8 hours) and in the procedure of temperature decreasing and slacking (5 hours to 6 hours). The temperature sensors 41, 43 not only transmit data to the controller of the entire system at the curing stage but also perform detection at other stages, so as to facilitate control of the changes of the temperature at the desorption stage and at the impregnation stage.

In each of the above embodiments, description is given by taking the magnetic yoke 21 of the outer rotor as an example. In the case that the rotor is designed as an inner rotor, radial exchange may be made correspondingly. For example, in the case of the inner rotor, the protective layer 242' is formed at the outer wall of the magnetic yoke 21, and the vacuum bag 25 and the like are provided at the outer wall of the magnetic yoke 21.

The above embodiments are only preferred embodiments of the present application. It should be noted that, for the person skilled in the art, a few of improvements and modifications may be further made without departing from the principle of the present application, and these improvements and modifications should also be deemed to fall into the protection scope of the present application.

The invention claimed is:

1. A vacuum desorption device for a protective layer of a magnetic pole, wherein a magnetic yoke and a vacuum bag form a sealed system, and wherein the vacuum desorption device comprises:
   a controller;
   a vacuum pump configured to perform vacuum desorption on the sealed system, and a heating device and/or an ultrasonic device,
wherein the controller is pre-stored with a functional relationship about a vacuum degree or pressure in the sealed system to control a procedure of the vacuum desorption, and parameters in the functional relationship comprise an average suctioned gas volume flow of the vacuum pump, duration of vacuumization, an initial pressure in the sealed system and an initial volume of the sealed system,
wherein the heating device and/or the ultrasonic device is configured to perform a heating desorption treatment on the sealed system, and the heating device is at least one of a microwave heating device, a far-infrared heat source and an electric heating film, the electric heating film is laid at a wall surface of the magnetic yoke, and a heat insulation layer is laid in addition to the electric heating film at the wall surface of the magnetic yoke,
a densimeter configured to detect an initial density and a current density, and
wherein an expansion procedure of gas suctioned out by vacuumization is a variable temperature procedure, and the parameters in the functional relation further comprise a polytropic index of a thermodynamic polytropic procedure.

2. The vacuum desorption device for the protective layer of the magnetic pole according to claim 1, further comprising:
a temperature sensor which is configured to detect an initial temperature in the scaled system and a current temperature in the sealed system during vacuumization and to output the initial temperature and the current temperature to the controller, and
wherein an expansion procedure of gas suctioned out by vacuumization is a variable temperature procedure, and the parameters in the functional relationship further comprise the initial temperature and the current temperature of the sealed system.

3. The vacuum desorption device for the protective layer of the magnetic pole according to claim 1, further comprising:
a pressure sensor which is configured to detect a current pressure in a procedure that the sealed system is vacuumized.

4. The vacuum desorption device for the protective layer of the magnetic pole according to claim 3, wherein the parameters in the functional relationship pre-stored in the controller further comprise an altitude, the initial pressure in the sealed system is determined by the altitude and a standard atmospheric pressure at sea level, and the initial density is determined by an initial relative humidity, an initial temperature, the initial pressure and a partial pressure of water vapor in saturated wet air.

5. The vacuum desorption device for the protective layer of the magnetic pole according to claim 1, wherein the vacuum pump is provided with a variable frequency governor to adjust the average suctioned gas volume flow of the vacuum pump.

6. The vacuum desorption device for the protective layer of the magnetic pole according to claim 1, further comprising:
an air inlet filter which are in communication with the sealed system,
wherein the heating device comprises an air heater, and air enters the sealed system under an action of the vacuum pump after passing through the air heater and the air inlet filter.

7. The vacuum desorption device for the protective layer of the magnetic pole according to claim 6, wherein an outlet air filter and/or a desorption process measurement device is provided between the sealed system and the vacuum pump, and the desorption process measurement device is configured to detect a content of water vapor in the air.

8. The vacuum desorption device for the protective layer of the magnetic pole according to claim 1, wherein two ends of the magnetic yoke are provided with sealing and shielding thermal insulation covers to enclose a microwave from the microwave heating device.

9. The vacuum desorption device for the protective layer of the magnetic pole according to claim 1, wherein the microwave heating device comprises a radiant heater for inputting a microwave, and an inside surface of the radiant heater facing the sealed system is provided with a water storage sponge.

10. A vacuum desorption, impregnation and curing system applied to a protective layer for a magnetic pole, having the vacuum desorption device according to claim 1, comprising:
a pressing strip;
a magnet steel;
a magnetic yoke;
a vacuum bag mounted to the wall surface of the magnetic yoke, and the wall surface of the magnetic yoke form the sealed system.

11. The vacuum desorption, impregnation and curing system applied to a protective layer for the magnetic pole according to claim 10, further comprising:
a system tank configured to load an impregnation liquid, wherein a stirrer configured to stir the impregnation liquid is provided inside the system tank.

12. The vacuum desorption, impregnation and curing system applied to a protective layer for the magnetic pole according to claim 11, wherein the system tank comprises a stirring tank and an output tank in communication with each other, the stirring tank is located upstream of the output tank, the stirrer is provided inside the stirring tank, and the output tank is further provided with an ultrasonic defoaming and vibrating bar.

13. The vacuum desorption, impregnation and curing system applied to a protective layer for the magnetic pole according to claim 12, wherein the stirring tank is provided with a first air outlet, the output tank is provided with a second air outlet, the first air outlet is communicated with a vacuum pump, and the second air outlet is communicated with the vacuum pump or atmosphere.

14. The vacuum desorption, impregnation and curing system applied to a protective layer for the magnetic pole according to claim 11, wherein a heating resistor is provided inside the stirrer to heat the impregnation liquid while stirring; the stirrer is driven by an electric motor, the electric motor is provided with a hollow shaft, and a bottom end of the hollow shaft is provided with a stirring blade of the stirrer; extension wires of a winding of the electric motor extend along the hollow shaft to the stirring blade and form an electrical circuit, the heating resistor is located at the stirring blade, and the extension wires are configured to supply electric power for the heating resistor.

15. The vacuum desorption, impregnation and curing system applied to a protective layer for the magnetic pole according to claim 10, wherein the stirrer is driven by an electric motor, the electric motor is provided with a hollow shaft, and a bottom end of the hollow shaft is provided with a stirring blade of the stirrer; an ultrasonic high-frequency vibration emission head is further provided at a bottom of the hollow shaft.

16. The vacuum desorption, impregnation and curing system applied to a protective layer for the magnetic pole according to claim 10, further comprising:
   a microwave preheating device, which is provided between a system tank and the sealed system, for microwave heating of an impregnation liquid before the impregnation liquid is input to the sealed system, wherein the system tank is configured to load the impregnation liquid.

17. The vacuum desorption, impregnation and curing system applied to a protective layer for the magnetic pole according to claim 16, wherein the microwave preheating device is provided with a resin chamber, a microwave from the microwave preheating device is input into the resin chamber; the impregnation liquid in the system tank enters the resin chamber to be heated; a non-metallic screen plate is provided inside the resin chamber, the screen plate is provided with a plurality of screen openings, and the impregnation liquid is heated by the microwave after passing through the screen openings.

18. The vacuum desorption, impregnation and curing system applied to a protective layer for the magnetic pole according to claim 10, further comprising:
   an ultrasonic wave emitting device configured to apply ultrasonic vibration to the protective layer during curing.

19. The vacuum desorption, impregnation and curing system applied to a protective layer for the magnetic pole according to claim 10, further comprising:
   a filling progress measurement device configured to detect a filling progress of filling with an impregnation liquid; and/or
   a thickness measurement device configured to detect a thickness of the protective layer.

* * * * *